United States Patent
Kosugi et al.

(10) Patent No.: US 7,080,285 B2
(45) Date of Patent: Jul. 18, 2006

(54) COMPUTER, SYSTEM MANAGEMENT SUPPORT APPARATUS AND MANAGEMENT METHOD

(75) Inventors: Mikayo Kosugi, Kawasaki (JP); Giro Hirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 771 days.

(21) Appl. No.: 09/765,632

(22) Filed: Jan. 22, 2001

(65) Prior Publication Data

US 2001/0044841 A1  Nov. 22, 2001

(30) Foreign Application Priority Data

May 17, 2000 (JP) .............................. 2000-144659

(51) Int. Cl.
*G06F 11/00* (2006.01)
(52) U.S. Cl. .............................. 714/36; 714/27; 714/48
(58) Field of Classification Search .................. 714/36, 714/27, 39, 26, 48, 25, 14, 47, 23; 713/2
See application file for complete search history.

(56) References Cited

U.S. PATENT DOCUMENTS

| | | | | |
|---|---|---|---|---|
| 5,884,073 | A * | 3/1999 | Dent ............................. | 713/2 |
| 6,038,689 | A * | 3/2000 | Schmidt et al. ............... | 714/48 |
| 6,145,102 | A * | 11/2000 | Klein et al. .................... | 714/47 |
| 6,178,528 | B1 * | 1/2001 | Poisner ......................... | 714/48 |
| 6,275,946 | B1 * | 8/2001 | Meir .......................... | 713/300 |
| 6,324,644 | B1 * | 11/2001 | Rakavy et al. ................. | 713/1 |
| 6,381,694 | B1 * | 4/2002 | Yen ............................... | 713/2 |
| 6,449,735 | B1 * | 9/2002 | Edwards et al. ............... | 714/25 |
| 6,487,464 | B1 * | 11/2002 | Martinez et al. .............. | 700/79 |
| 6,567,937 | B1 * | 5/2003 | Flores et al. ................... | 714/46 |
| 2002/0042896 | A1 * | 4/2002 | Johnson et al. ............... | 714/47 |
| 2003/0070115 | A1 * | 4/2003 | Nguyen et al. ............... | 714/23 |
| 2003/0163765 | A1 * | 8/2003 | Eckardt et al. ............... | 714/36 |

FOREIGN PATENT DOCUMENTS

| | | |
|---|---|---|
| JP | 61-166637 | 7/1986 |
| JP | 11-110248 | 4/1999 |
| JP | 11-161518 | 6/1999 |
| JP | 11-296480 | 10/1999 |

OTHER PUBLICATIONS

Bell, Donnie, Lance Osborne, Jon McGary, Remote Systems Management Using the Dell Remote Access Card, May 2002, Dell PowerSolutions, pp. 81-84.*

* cited by examiner

*Primary Examiner*—Robert Beausoliel
*Assistant Examiner*—Marc Duncan
(74) *Attorney, Agent, or Firm*—Staas & Halsey LLP

(57) ABSTRACT

A start processing unit conducts start processings including a self diagnosis processing and a BOOT processing of an operating system and then starts an application when power of a computer system is turned on. A trouble notification unit controls the power of the computer system and integrally monitors a trouble of the start processing unit and a trouble during system operation. The trouble notification unit, provided as a server management support board, acquires log information stored in the start processing unit and notifies an external remote maintenance system of the log information as well as an alarm message trough a dedicated network interface when the trouble notification unit detects the trouble of the start processing unit (system down).

23 Claims, 18 Drawing Sheets

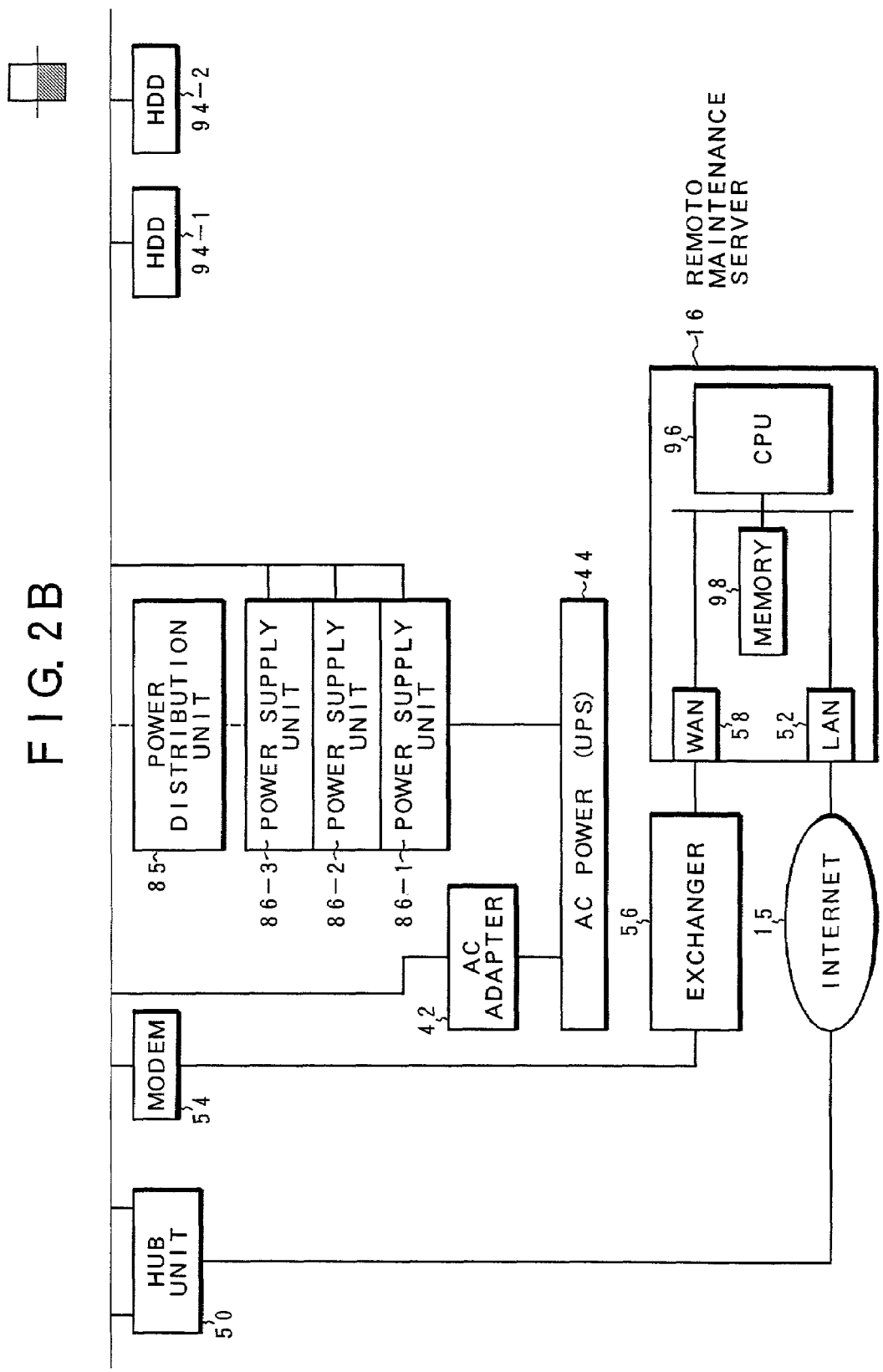

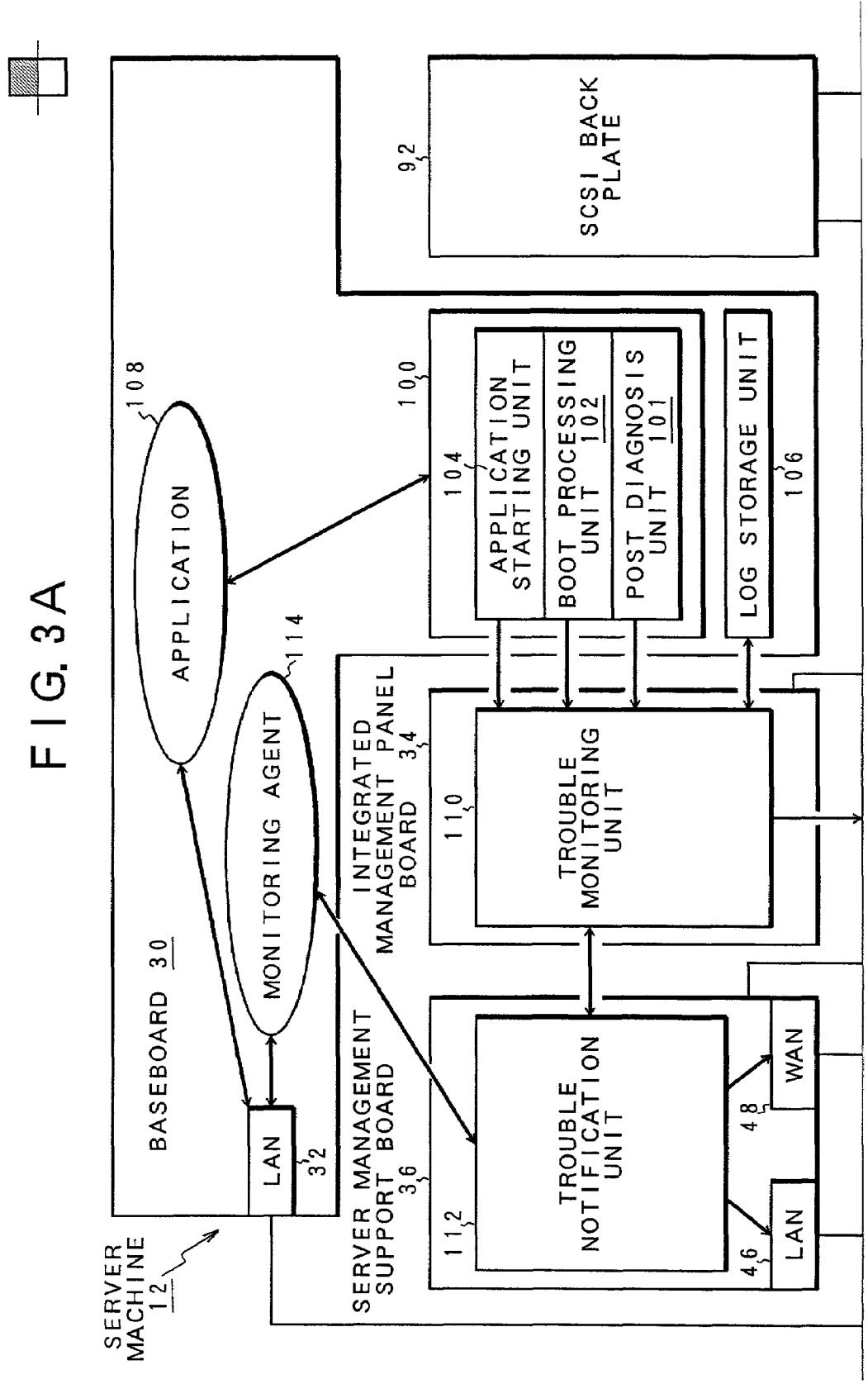

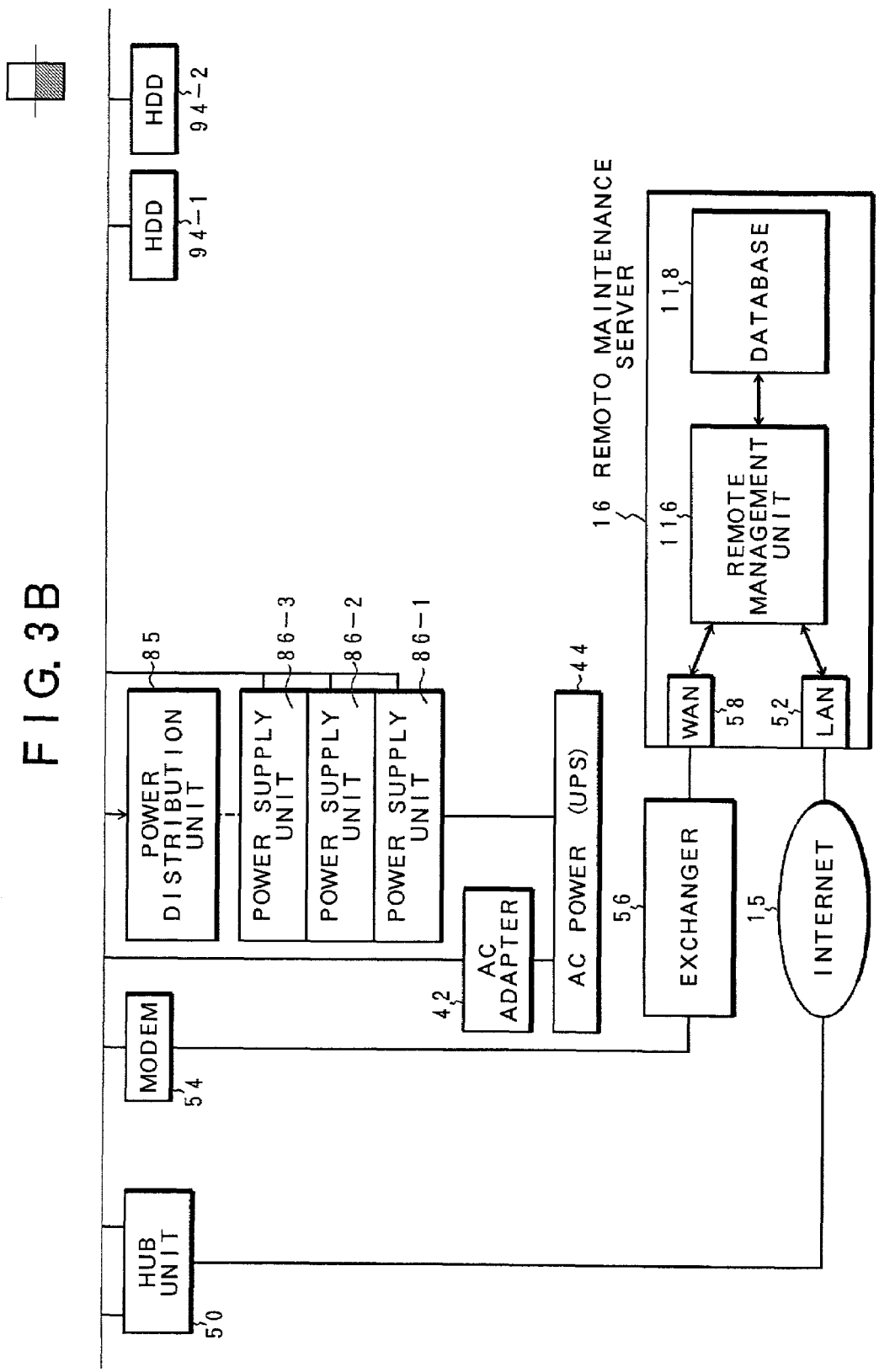

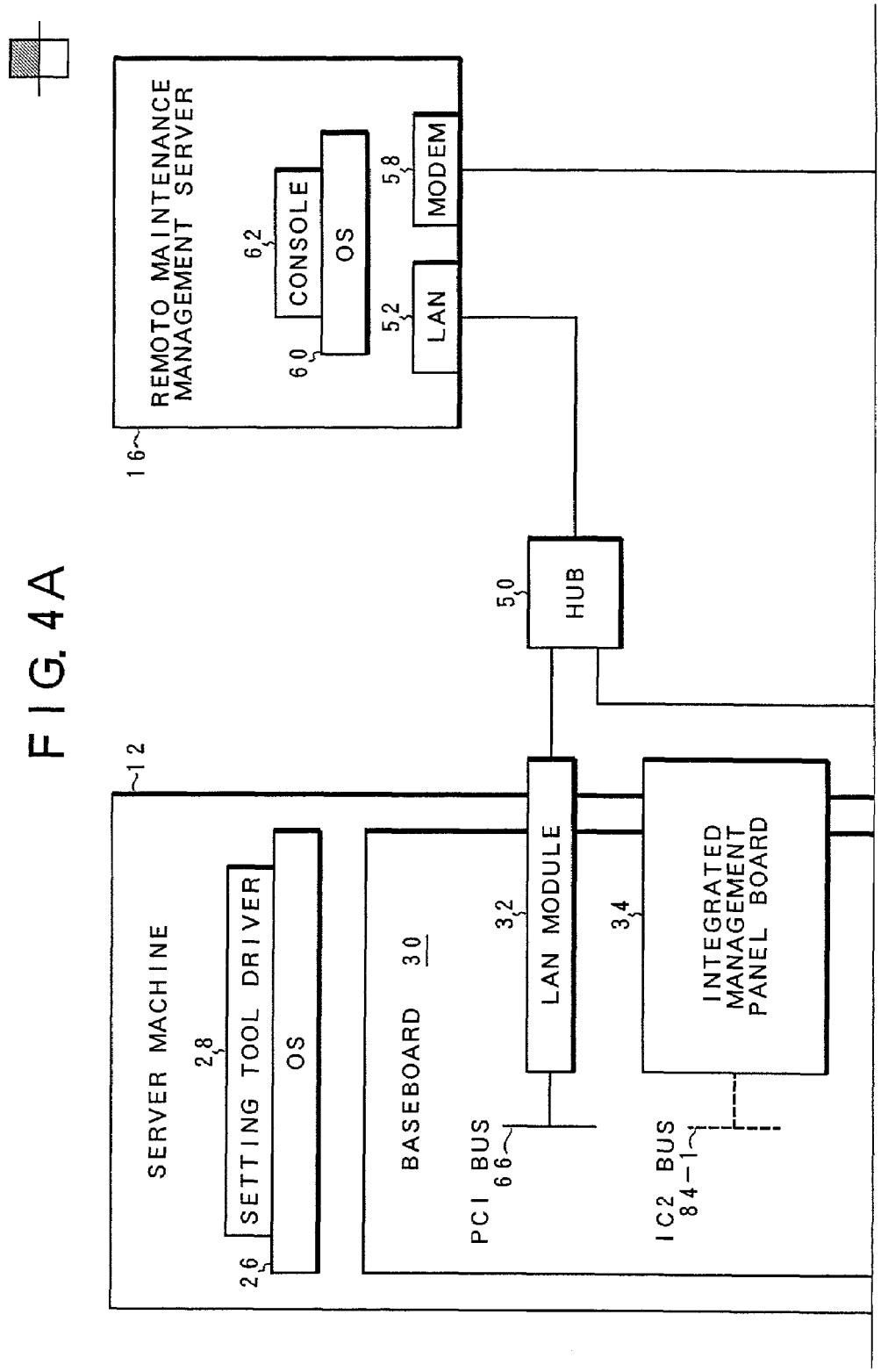

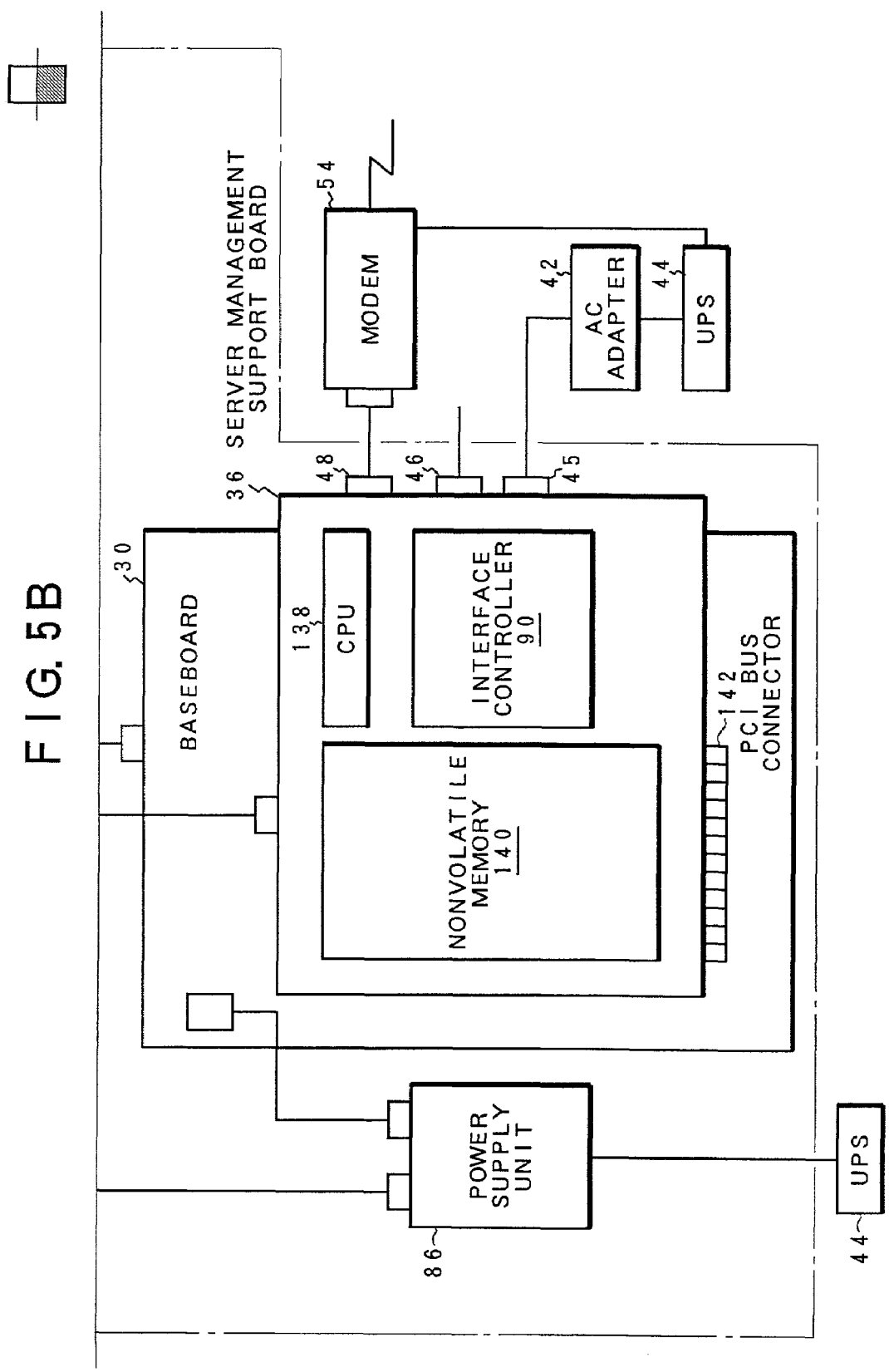

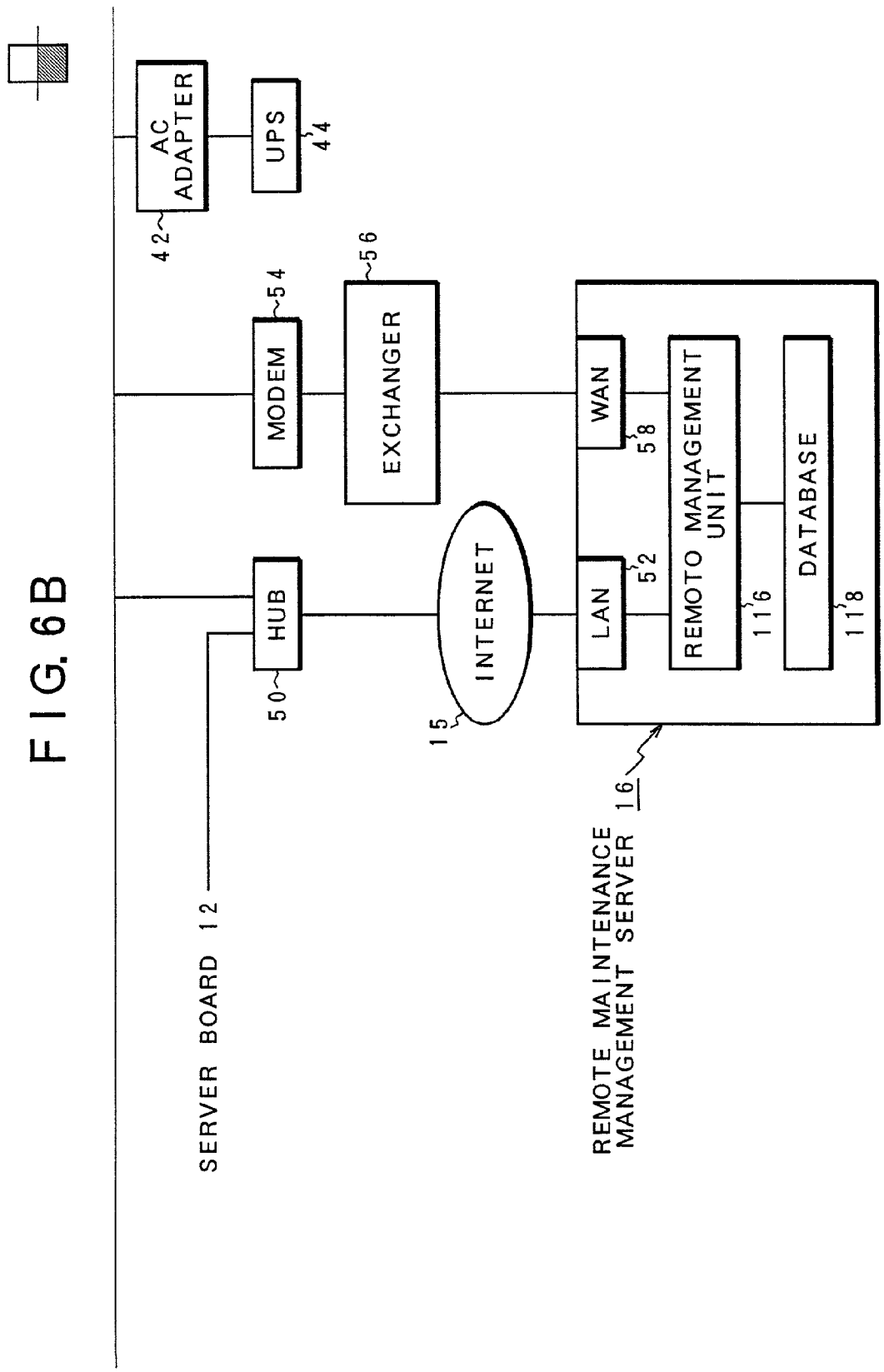

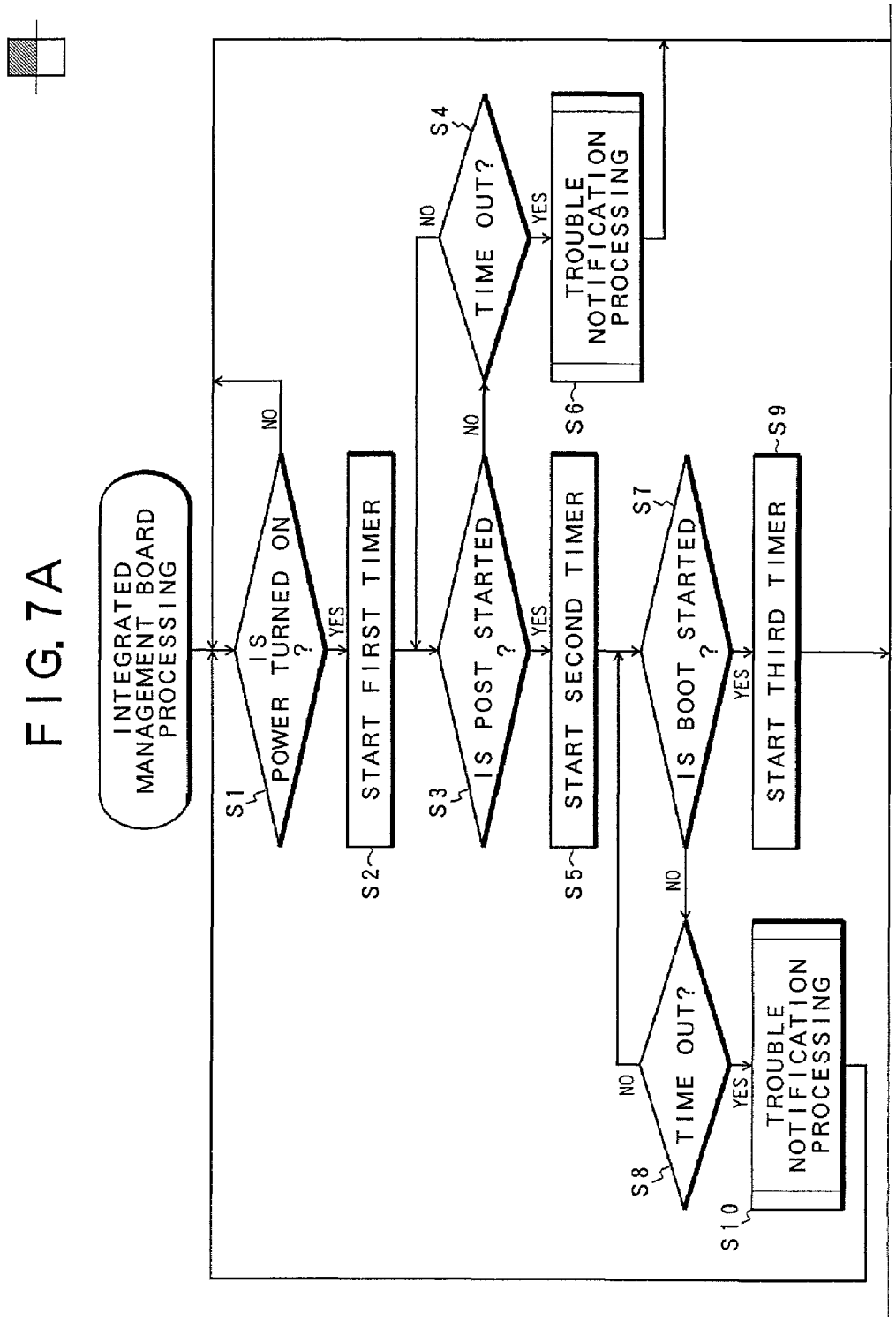

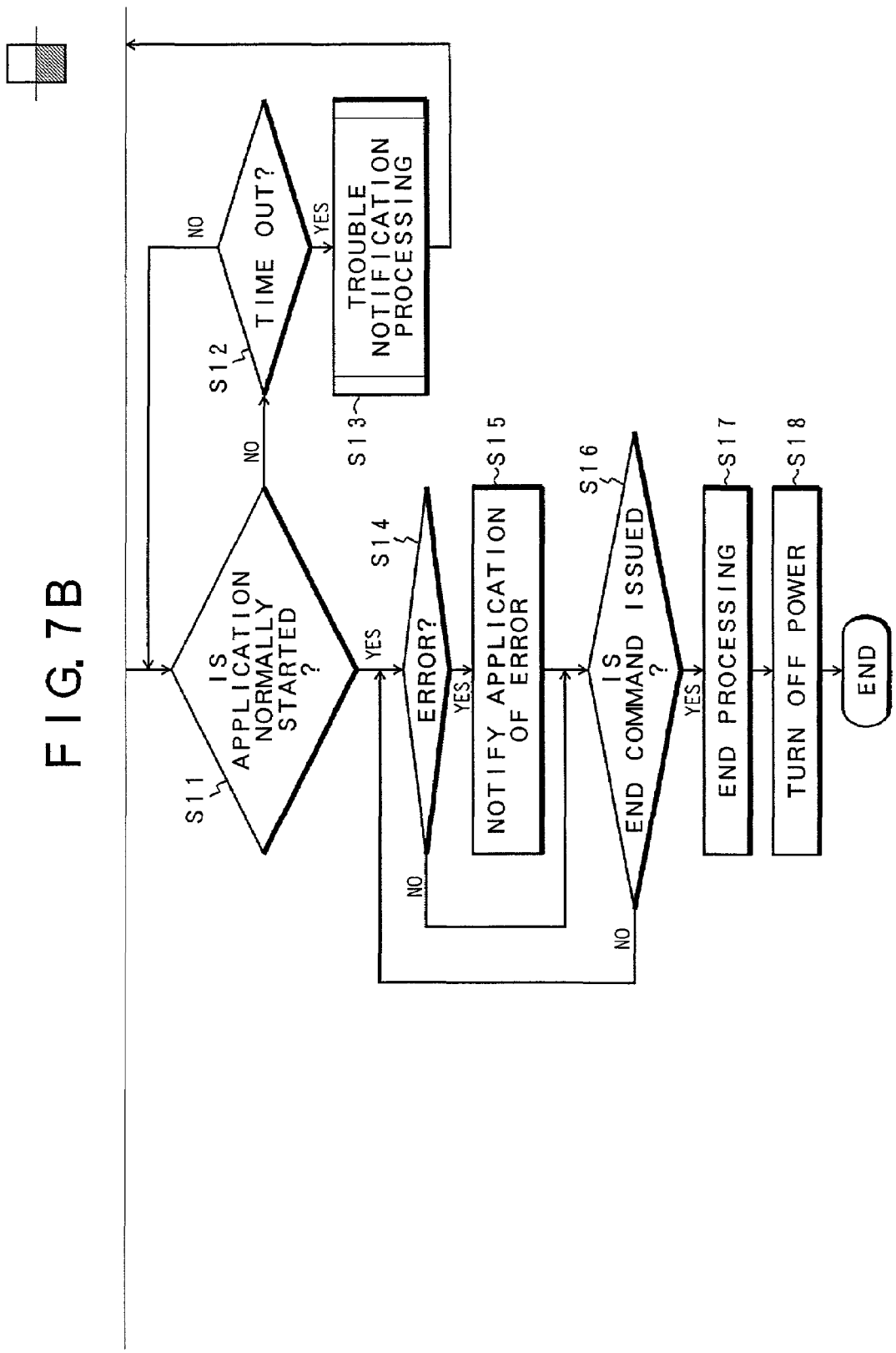

COMPUTER, SYSTEM MANAGEMENT SUPPORT APPARATUS AND MANAGEMENT METHOD

BACKGROUND OF THE INVENTION

1. Field of the Invention

The present invention relates to a computer, a management support apparatus and a management method for notifying an external remote maintenance system if a trouble which occurs since the power of a computer system such as a server is turned on until an application is started through a network interface. The present invention particularly relates to a computer, a management support apparatus and a management method for notifying an external remote maintenance system of the occurrence of a trouble by adding a support board to an integrated management panel board which monitors a system.

2. Description of the Related Arts

Conventionally, if a high-level IBM-PC architecture standardized in the industry involved is adopted to a server machine or the like, the function of system management is insufficient due to the PC architecture and is not standardized. Due to this, it is necessary to add a system management function individually of the server machine or the like. Such a system management function is conventionally provided by an integrated management panel board (or IMP board). The IMP board conducts on/off-controls the power of a system, monitors the state of the system using a temperature sensor and a voltage sensor provided on a main baseboard, controls a fan and others. Further, when the power is turned on, the baseboard conducts a self diagnosis processing (POST diagnosis) and a BOOT processing. When these start processings are normally ended, a system application is started and the server system turns into an operable state. Conventionally, if a trouble during the baseboard start processings occurs at the time of turning on the power of the system, the IMP board detects the trouble and displays the occurrence of the trouble on a liquid crystal display panel or an LED. A user's side administrator, therefore, recognizes the type of the trouble from the liquid crystal display panel or the LED and notifies a service company of the direct cause of the trouble. The maintenance worker of the service company is dispatched to a server machine having the trouble in response to the user's notification and judges the state of the trouble from the display of the IMP board. In addition, the maintenance worker acquires a system log (BIOS log) stored in a nonvolatile memory provided on the baseboard, clears up the cause of the trouble and conducts necessary repair operations. On the other hand, if a hardware trouble such as one-bit error or two-bit error occurs during the operation of the system after the application is normally started, the IMP board detects such a hardware trouble. Then, if necessary, using an automatic notification function which operates as an application, an external remote maintenance system is automatically notified of an alarm message indicating the occurrence of the hardware trouble. Further, since it is essential to make clear the root cause of the system trouble as soon as possible, it is also possible to read a system log and notify the remote maintenance system of the system log as well as the alarm message.

However, if a trouble occurs and the system is down in a start processing phase before the application is started, e.g., in a self diagnosis processing or BOOT processing phase, it is impossible for the application to automatically notify the remote maintenance system of the trouble. Due to this, in case of system down while starting the system, the administrator of the user system can only notify the maintenance company of the direct cause of the trouble over the telephone or the like and it is difficult to make clear the root cause of the trouble based on the notified information. In addition, in order to acquire the system log which is a clue for clearing up the root cause, it is necessary that the maintenance worker restarts the system to which abnormality occurs and then acquires the system log. Thus, it disadvantageously takes time and labor to acquire the system log.

SUMMARY OF THE INVENTION

According to the present invention, there are provided a computer, a maintenance support apparatus and a maintenance method for automatically notifying an external remote maintenance system of the occurrence of a trouble at the time of starting a system until a system application is started.

Further, according to the present invention, there are provided a computer, a maintenance support apparatus and a maintenance method for automatically notifying an external remote maintenance system of system log information used to clear up the cause of a trouble as well as the occurrence of the trouble.

The present invention is adapted to a computer characterized by comprising: a start processing unit which conduct a start processing, and then start an application when power of a computer system is turned on; a trouble monitoring unit which control the power of the computer system, and integrally monitor a trouble of the start processing unit and a trouble during system operation; and a trouble notification unit which acquire log information stored in the start processing unit, and notify an external remote maintenance system of the log information through a dedicated network interface (LAN) with the alarm message if the trouble monitoring unit detects the trouble of the start processing unit (system down). Due to this, if abnormality occurs to the computer system at the time of starting the system before starting the application, the computer system itself displays the occurrence of the trouble and also a system, such as a remote maintenance server, provided in an external support center or the like is automatically notified of the occurrence of the abnormality and a system log. Thus, the support center can recognizes the abnormality of the system and can clear up the cause of the abnormality by referring to the system log, thereby making it possible to contribute to solving the problem as soon as possible and to strongly support the system management.

Here, the start processing unit is provided on a baseboard, the trouble monitoring unit is provided on an integrated management panel board (IMP board), and the trouble notification unit is provided on a server management support board (system management support board), the server management support board comprising a dedicated power unit using dedicated AC adapter constantly supplied with power, a board interface connected to the integrated management panel board, and the dedicated network interface connecting the remote maintenance system. As stated above, by providing the function of the trouble notification unit as a server management support server, the function, according to the present invention, of automatically notifying an external system of the abnormality of the system which occurred at the time of starting the system before starting the application and of the system log thereof is provided, as the server management support board, to the system having a standard specification and provided with the known baseboard and integrated management panel board, thereby making it possible to simply, easily establish a strong support structure linked to the external maintenance system.

The server management support board is an interface board connected to an interface provided on the baseboard of the computer system. For example, the server management support board is provided as a PCI board connected to a PCI (Peripheral Component Interconnect) bus provided on the baseboard of the computer system. Due to this, by attaching the system management support board according to the present invention, provided as the PCI board, to an empty PCI bus slot on the baseboard, it is possible to easily establish a strong support structure linked to the external maintenance system.

Furthermore, the present invention is characterized in that a monitoring agent which monitor the trouble of the trouble notification unit provided on the server management support board is provided on the computer system side as an application, and an interface coupled to the monitoring agent is provided on the system management support board. For example, the interface coupled to the monitoring agent is a PCI bus. Due to this, the system operation after the application is started is monitored by the monitoring agent on the computer system side in which the function of the trouble notification unit provided by the server management support board operates as an application, and the trouble of the server management support board can be appropriately dealt with. To be specific, the trouble notification unit on the server management support board stores a communication failure flag in a memory when notification of an alarm message and the log information to the remote maintenance system fails; and if the computer system is restarted, the monitoring agent on the computer system side notifies the remote maintenance system of the alarm message indicating that a communication trouble occurred to the trouble notification unit through the network interface (LAN) on the baseboard based on the communication failure flag. Due to this, if the computer system is down during the start processing and a trouble also occurs to the communication function of the trouble notification unit on the server management support board, the external support center cannot recognize the abnormality of the system because remote communication cannot be made. However, if the system can be normally restarted after the system was down, the monitoring agent automatically notifies the support center of the system down which occurred previously, the system log thereof and the abnormality of the communication function of the server management support board, thereby making it possible to appropriately deal with the trouble of the server management support board.

Further, the trouble notification unit on the server management support board regularly communicates with the remote maintenance system using a network interface (LAN) of the trouble notification unit itself, and stores a communication failure flag in a memory when detecting abnormality of communication; and the monitoring agent on the server system side notifies the remote maintenance system of an alarm message indicating a communication trouble on the trouble notification unit side through the network interface on the baseboard based on the communication failure flag. By regularly communicating with the external remote management system through the network interface of the server management support board and notifying the support agent from the monitoring agent on the system side that the abnormality of the communication is detected, it is possible to further enhance the monitoring function of the server management support board and to further improve system reliability. Moreover, the monitoring agent on the communication system side regularly issues a regular notification command (heartbeat command) indicating that the computer system normally operates; and the trouble notification unit on the server management support board detects that the computer system is abnormal if the regular notification command is stopped, and notifies the remote maintenance system of an alarm message. By providing the server management support board with a watchdog function, it is possible to automatically notify the external support center of the abnormality of the system if the system is down during the system operation.

Further, the present invention provides a system management support apparatus (server management support board) itself for automatically notifying the external support center of the abnormality of the system. This system management support apparatus is characterized by comprising: a power supply unit which constantly supply power and use dedicated AC adapter; a board interface which control power of a computer system, and connect to an integrated management panel board for monitoring a trouble of the computer system; a network interface (LAN) connecting an external remote maintenance system; and a trouble notification unit which acquire log information when receiving trouble information generated since the power of the system is turned on until a start processing is conducted and an application is started, from the integrated management panel board, and notify the external remote maintenance system of the log information, and characterize in that the power supply unit, the board interface, the network interface and the trouble notification unit are provided on a board connectable to an interface of the computer system. In this system management support apparatus, the power supply unit, the board interface, the network interface and the trouble notification unit are provided on an interface board connected to an interface provided on a baseboard of the computer system. To be specific, the power supply unit, the board interface, the network interface and the trouble notification unit are provided on a PCI board connected to a PCI bus provided on a baseboard of the computer system. Further, in the system management support apparatus, an interface, e.g., a PCI bus, coupled to a monitoring agent provided on the computer system side as an application is provided. The trouble notification unit of the system management support apparatus stores a communication failure flag in a memory when notification of an alarm message and the log information to the remote maintenance system fails; and if the computer system is restarted, the monitoring agent on the computer system side notifies the remote maintenance system of the alarm message indicating that a communication trouble occurred to the trouble notification unit through the network interface (LAN) on the baseboard based on the communication failure flag. In addition, the trouble notification unit of the system management support apparatus regularly communicates with the remote maintenance system using a network interface of the trouble notification unit, and stores a communication failure flag in a memory when detecting abnormality of communication; and the monitoring agent on the computer system side notifies the remote maintenance system of an alarm message indicating abnormality of communication on the trouble notification unit side through the network interface (LAN) on the baseboard based on the communication failure flag. Further, the trouble notification unit of the system management support apparatus detects that the computer system is abnormal if a regular notification command (heartbeat command) regularly issued from the monitoring agent on the computer system side is stopped, and notifies the remote maintenance system of an alarm message.

Moreover, the present invention provides a computer system management method. The computer system management method is characterized by comprising: a start processing operation of conducting a start processing, and then starting an application when power of a computer system is turned on; a trouble monitoring operation of controlling the power of the computer system, and integrally monitoring a trouble of the start processing unit; and a trouble notification operation of acquiring log information, and notifying an external remote maintenance system of the log information through a dedicated network interface with an alarm message if the trouble of the start processing unit is detected in the trouble monitoring operation. Also, a monitoring agent provided on the computer system side as an application monitors the trouble in the trouble notification operation. To be specific, in the trouble notification operation, a communication failure flag is stored in a memory when notification of an alarm message and the log information to the remote maintenance system fails; and if the computer system is restarted, the monitoring agent notifies the remote maintenance system of the alarm message indicating that a trouble occurred to the trouble notification operation through the network interface on the computer system side based on the communication failure flag. Further, in the trouble notification operation, communication with the remote maintenance system is regularly established using a network interface, and a communication failure flag is stored in a memory when abnormality of the communication is detected; and the monitoring agent notifies the remote maintenance system of an alarm message indicating abnormality of the communication in the trouble notification operation side through the network interface on the computer system side based on the communication failure flag. Additionally, the monitoring agent regularly issues a regular notification command (heartbeat command) indicating that the computer system normally operates; and in the trouble notification operation, abnormality of the computer system is detected if the regular notification command is stopped, and an alarm message is notified to the remote maintenance system.

The above and other objects, features, and advantages of the present invention will become more apparent from the following detailed description with reference to the drawings.

BRIEF DESCRIPTION OF THE DRAWINGS

FIGS. 2A and 2B are block diagrams of a hardware constitution according to the present invention;

FIGS. 3A and 3B are block diagrams of a software constitution according to the present invention;

FIGS. 4A and 4B are explanatory views for a board constitution according to the present invention;

FIGS. 5A and 5B are detailed explanatory views for the hardware constitution of an integrated management panel (IMP) board and a server monitoring support board;

FIGS. 6A and 6B are block diagrams of the hardware constitution of the server maintenance support board shown in FIGS. 5A and 5B;

FIG. 7 is a flowchart showing a series of integrated management panel (IMP) board processings conducted by a trouble monitoring unit shown in FIGS. 2A and 2B;

DETAILED DESCRIPTION OF THE PREFERRED EMBODIMENT

Figure 1:
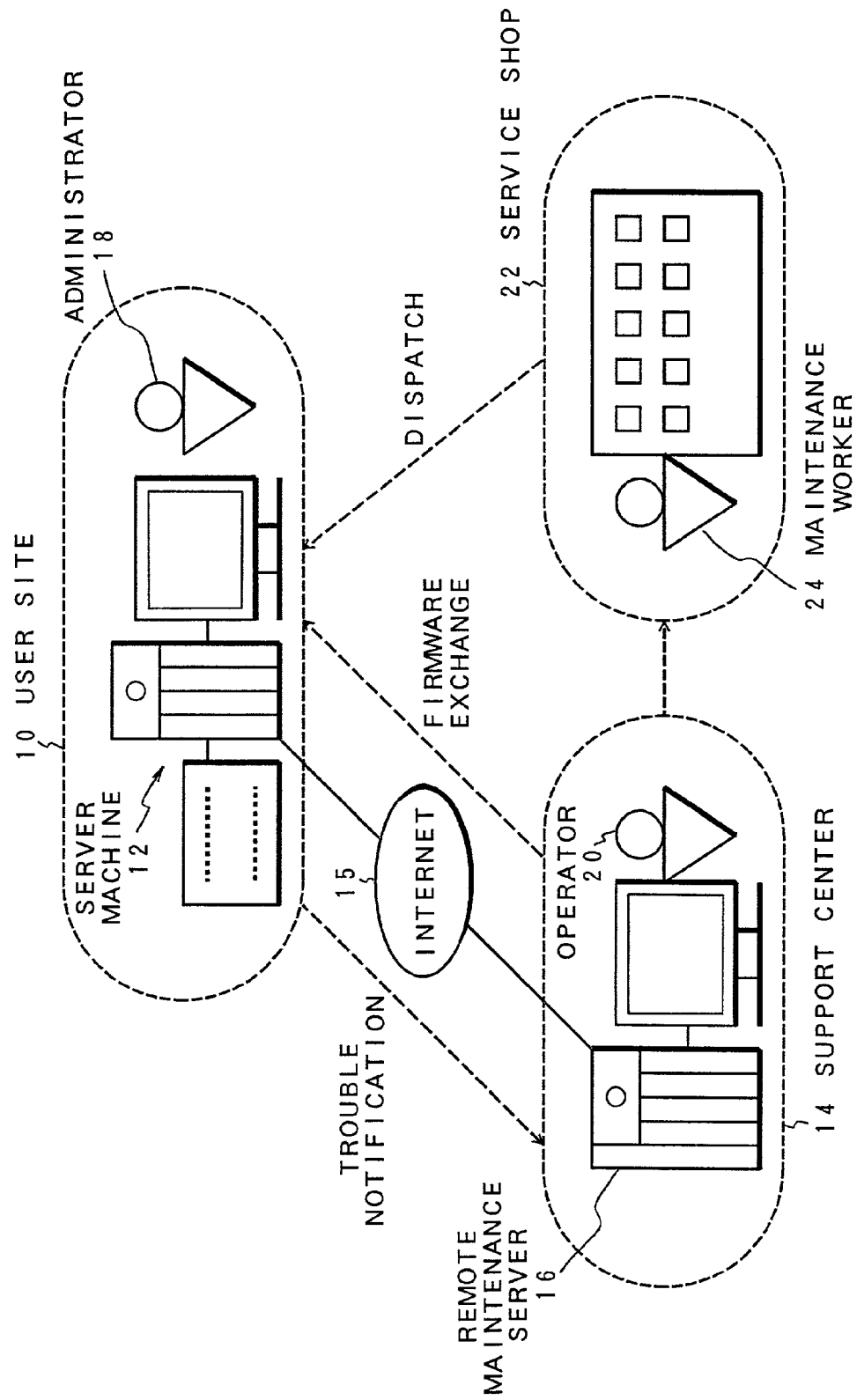
FIG. 1 is an explanatory view for a service structure utilizing the present invention.

FIG. 1 is an explanatory view for the service structure of a computer system utilizing the present invention. A server machine 12 is provided at a user site 10 and the operation of the server machine 12 is managed by an administrator 18 of user site 10. A support center 14 is provided opposite to the user site 10 and a remote maintenance server 16 is provided in the support center 14. The server machine 12 of the user site 10 is connected to the remote maintenance server 16 of the support center 14 by the Internet 15. The server machine 12 transmits a system log which becomes the trouble notification of and trouble information on the server machine 12 to the maintenance server 16 through the Internet 15. The communication of this trouble notification and the trouble information is established by sending an electronic mail from the server machine 12 to a mail server on the Internet 15 and receiving the electronic mail at the remote maintenance server 16 from the mail server. Also, the remote maintenance server 16 distributes, for example, a firmware to the server machine 12 through the Internet 15. If the remote maintenance server 16 receives the trouble notification and the trouble information from the server machine 12, the operator 20 of the support center 14 recognizes the trouble notification and the trouble information received from the server machine 12, and instructs the maintenance worker 24 in a service shop 22 to conduct a maintenance operation to the server machine 12 to which the trouble occurs. The maintenance worker 24 conducts a repair operation to the server machine 12 to which the trouble occurs in accordance with the instruction from the support center 14 without waiting for the administrator 18 of the user site 10 to notify the worker 24 of the trouble. Needless to say, such a support by the server machine 12 in response to the trouble notification is conducted according to the maintenance agreement concluded between the support center 14 and the user site 10. The maintenance apparatus according to the present invention is applied to the server machine 12 and is particularly characterized by notifying the remote maintenance server 16 of the support center 14 of the trouble notification and a system log following the trouble with respect to system down caused by the trouble which occurs since the power of the server machine 12 is turned on until an application is started.

Figure 2A:
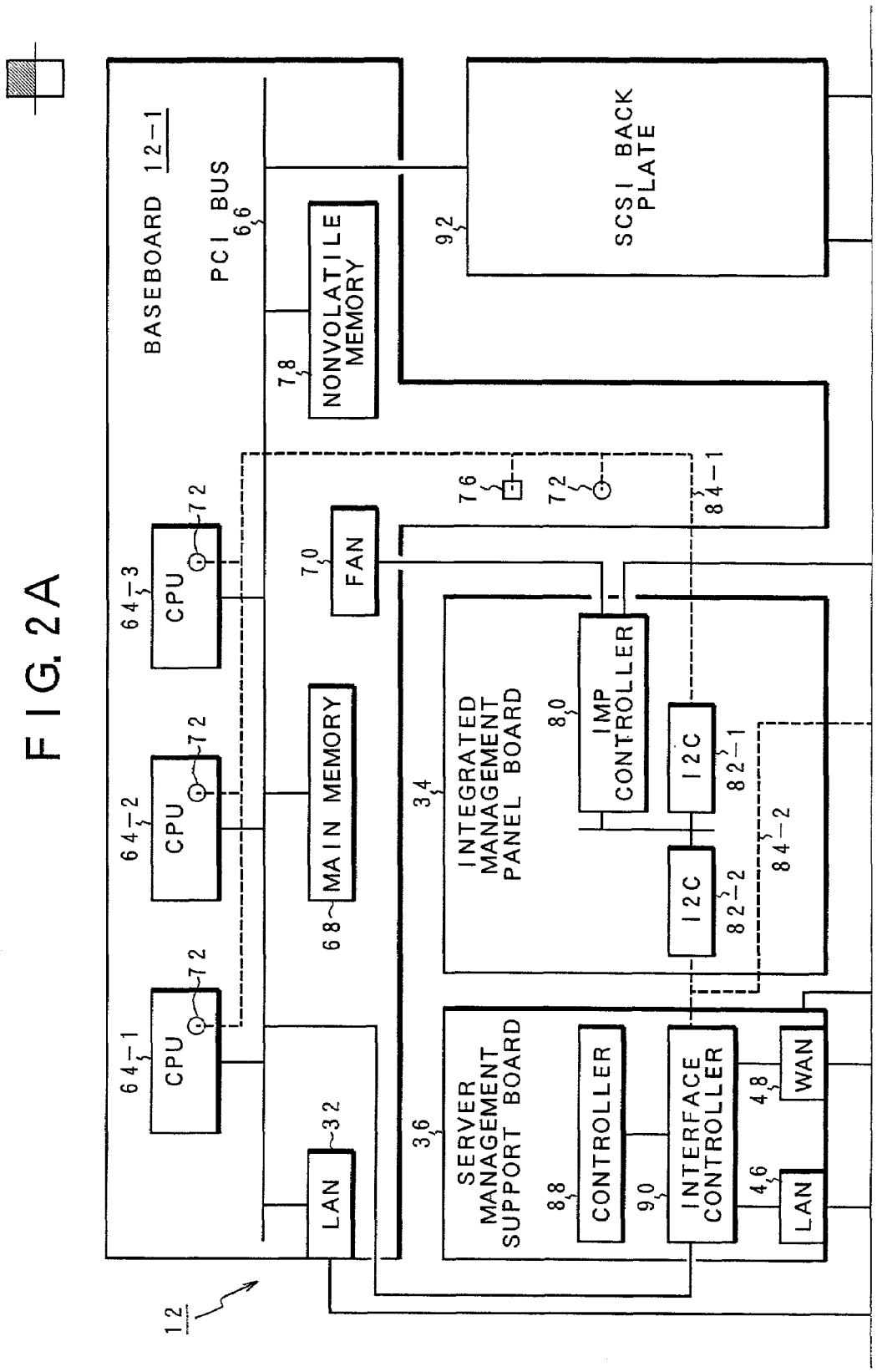

FIGS. 2A and 2B show the hardware constitution of the server machine 12 shown in FIG. 1 as well as the constitution of the remote maintenance server 16. The server machine 12 comprises, as a standard specification, not only a main baseboard 30 but also an SCSI back plate 92 connecting HDD's 94-1 and 94-2 serving as external memories to the server machine 12 and an integrated management panel board (to be referred to as 'IMP' board hereinafter) 34 conducting the power control of the server machine 12, starting start processings and monitoring the occurrence of a trouble during the operation. In addition to the baseboard 30, the SCSI back plate 92 and the IMP board 34, the present invention further provides a server maintenance support board 36. The server maintenance support board 36 notifies the external remote maintenance server 16 of an alarm message indicating that system down occurs and the system log (BIOS log) at the time since the power of the system is turned on until the application is started using a network interface, i.e., if the server maintenance support board 36 is notified by the IMP panel board 34 of the system down caused by the trouble which occurs during a self diagnosis processing (POST diagnosis processing), a BOOT processing and an application start processing conducted by the baseboard 30 by means of an electronic mail and an attachment file thereof. The baseboard 30 is provided with, for example, CPU's 64-1, 64-2 and 64-3 functioning as an IA server (Intel architecture server). An LAN module 32 serving as a network interface, a main memory 68 used as a main storage device, a nonvolatile memory (NVRAM) 78 and the SCSI back plate 92 are connected to the CPU's 64-1 to 64-3 by PCI bus 66. A server board 12-1 is provided with a cooling fan 70, and the CPU's 64-1 to 64-3 are provided with a temperature sensor 72 for monitoring purposes. The CPU's 64-1 to 64-3 on the baseboard 30 execute a self diagnosis processing and a BOOT processing for starting the operating system OS of the server machine 12 and an application start processing including a middleware start processing when the power is turned on or the system is reset. Further, the baseboard 30 is provided with the temperature sensor 72 and a voltage sensor 76 for monitoring the state. The IMP board 34 conducts the integrated monitoring of the temperature and voltage of the server machine 12 and various errors. An IMP controller 80 is provided on the IMP board 34 and connected to the fan 70 on the baseboard 30, a power distribution unit 85 and power supply units 86-1 to 86-3 by monitoring interfaces such as an IMPI (Intelligent Platform Management Interface). Also, the IMP board 34 is provided with I2C controllers 84-1 and 84-2 serving as monitoring dedicated interfaces, which controllers are connected to the baseboard controller 72 and the nonvolatile memory 78 on the baseboard 30 by an I2C bus 84-1. Also, an I2C bus 84-2 from the I2C controller 84-2 side is connected to the power distribution unit 85 and the power supply units 86-1 to 86-3. The I2C bus 84-1 pulled toward the baseboard 30 side is connected to the temperature sensor 72 and the voltage sensor 76 on the baseboard 30 and also to temperature sensors 72 provided in the CPU's 64-1 to 64-3, respectively. The IMP board 34 controls the power of the system to be turned on following the operation of the administrator to turn on power. After turning on the system power, the IMP board 34 monitors whether a trouble occurs for a self diagnosis, BOOT and an application start processing executed by the CPU's 64-1 to 64-3 of the baseboard 30. If the operating system OS is normally started and the application is started by the operation of the baseboard 30, the IMP board 34 monitors whether a hardware error such as a one-bit error and a two-bit error occurs in the processings of the CPU's 64-1 to 64-3. If detecting an error, then the IMP board 34 displays the error on the panel itself and notifies the monitoring agent which operates as an application on the server board 12-1 side of the error. The monitoring agent notifies the remote maintenance server 16 of an abnormality which occurs during the operation of the application using a LAN module 32 provided on the server board 12-1 side and serving as a network interface.

The server maintenance support board 36 newly adopted according to the present invention comprises a controller 88, an interface controller 90, a LAN module 46 serving as a network interface, and a WAN module 48. Since the interface controller 90 is connected to the I2C bus 84-2 from the IMP board 34, the interface controller 88 can communicate commands and data with the IMP controller 80 on the IMP board 34 and with the baseboard controller 72 on the baseboard 30. If a trouble causing system down occurs and the IMP controller 80 detects the trouble while CPU's 64-1 to 64-3 operate since the system power is turned on until the application is started, the detected error is also notified to the controller 88 of the server management support board 36. If the controller 88 is notified of the error during the BOOT processing, the controller 88 notifies the remote maintenance server 16 of an alarm message indicating system down caused by the error which occurs during the BOOT processing of the baseboard 30 by means of an electronic mail through the interface 15 using the LAN module 46 serving as the network interface. Further, the controller 88 also acquires a system log stored in the nonvolatile memory 78 of the baseboard 30, to be specific, a BIOS log in addition to the alarm message indicating the system down during the BOOT processing, and notifies the remote maintenance server 16 of the system log as the attachment file of the electronic mail including the alarm message through the Internet 15. Here, as the network interfaces of the server management support board 36, there are provided two interfaces, i.e., a network interface of the LAN module 46 using the Internet 15 and a network interface of a public telephone network using the WAN module 48 by way of a modem 54 and an exchanger 56. Due to this, if a trouble occurs to the LAN module 46 side network interface, the WAN module 48 can notify the remote maintenance server 16 of the trouble and a system log thereof by means of the public telephone network basis network interface. Further, the server management support board 36 is supplied with power independent of the server machine 12 from an AC adapter 42. The AC adapter 42 is directly connected to an AC power supply 44 known as a user power supply (UPS) and constantly supplies power to the server management support server 36. Due to this, while the supply of power to the server machine 12 side is stopped under the power control of the IMP board 34 at need, the server management board 36 is always supplied with power and continuously operates whether the server machine 12 is stopped or operated. The remote maintenance server 16 remotely monitoring the server machine 12 comprises a LAN module 52, a WAN module 58, a CPU 96 and a memory 98.

FIGS. 3A and 3B show the software constitution of the server machine 12 and that of the remote maintenance server 16 shown in FIGS. 2A and 2B. The baseboard 30 is provided with a start processing unit 100. The start processing unit 100 consists of a POST diagnosis unit 101, a BOOT processing unit 102 and an application starting unit 104. Also there is provided a log storage unit 106 using a nonvolatile memory. A trouble monitoring unit 110 is provided on the IMP board 34 to control the power of the system and to monitor the trouble of the start processing unit 100 provided on the baseboard 30 and a trouble during the system operation. A trouble notification unit 112 is provided on the server management support board 36 newly adopted according to the present invention. The trouble notification unit 112 acquires a system log stored in the log storage unit 106 of the baseboard 30 by way of the IMP board 34 if the trouble monitoring unit 110 of the IMP board 34 detects the trouble of the start processing unit 100 on the baseboard 30, creates an electronic mail including an alarm message indicating that the system is down due to the trouble during the start processing, and transmits the electronic mail to the mail server by way of the LAN module 46, a hub unit 50 and the Internet 15 while adding an attachment file of the system log acquired from the log storage unit 106 of the baseboard 30, to the electronic mail. As a result, the remote maintenance server 16 receives the electronic mail and receives the alarm message and the system log thereof from the trouble notification unit 112, thereby making it possible to clear up the cause of the trouble. Further, on the baseboard 30, an application 108 started by the start processing of the start processing unit 100 exists and there is newly provided a monitoring agent 114 monitoring the server management support board 36 newly adopted according to the present invention as an application. Namely, the present invention has a strong monitoring constitution such that the server management support board 36 can notify the remote maintenance server 16 of the trouble which occurs during the server start processing and the system log thereof and that the monitoring agent 114 which operates as an application, monitors the function of the server management support board 36 itself. The monitoring agent 114 is coupled to the trouble notification unit 112 on the server management support board 36 by a system-side PCI bus. The monitoring agent 114 regularly issues a heartbeat command as a regular notification command indicating the normal operation of the server machine 12. The trouble notification unit 112 monitors the heartbeat command issued from the monitoring agent 114. If the heartbeat command is stopped, the trouble notification unit 112 judges that the server machine 12 hangs and notifies the remote maintenance server 16 of an alarm message indicating that the system hangs and a system log obtained at this time by means of an electronic mail through the LAN module 46 serving as the network interface. The monitoring agent 114 also conducts processings for detecting the communication trouble of the network interface of the management support board 36 and presenting the communication trouble to the remote maintenance server 16. That is to say, if a trouble occurs to the start processing unit 100 of the baseboard 30 at the time of starting the server and the system is down, the trouble notification unit 112 of the server management support board 36 receives the detection of this trouble from the trouble monitoring unit 110 and notifies the remote maintenance server 16 of an alarm message indicating system down during the start processing and a system log thereof obtained at this time by means of an electronic mail. If the trouble notification unit 112 intends to send a mail to the mail server on the Internet 15 and the electronic mail cannot be normally sent to the mail server because the mail server has no response to the mail (connect time-out) or an abnormality in a communication protocol is detected, then a communication trouble flag indicating the trouble of electronic mail communication is stored in the PCI communication buffer of the nonvolatile memory provided in the server management support board 36. If the administrator of the server machine 12 turns on the power of the system again, a start processing is normally conducted and the application 108 and the monitoring agent 114 are started after such system down at the time of starting the system, the monitoring agent 114 reads the communication trouble flag indicating the trouble stored in the nonvolatile memory and indicating the trouble at the time of starting the system previously using the trouble notification unit 12 of the server management support board 36, recognizes that a trouble occurred during the start processing at the time of turning the power on previously, and notifies the remote maintenance server 16 of the communication trouble on the server management support board 36, the system down which occurred during the previous start processing and the system log thereof by means of an electronic mail and an attachment file thereof using the LAN module 32 serving as a baseboard 30 side network interface. The remote maintenance server 16 comprises a remote management unit 116 and a database 118. The database 118 stores various management information on the server machine to be managed. The remote management unit 116 receives an electronic mail from the trouble notification unit 112 on the server management support board provided on the server machine 12 side and opens the electronic mail, thereby displaying the alarm message indicating system down at the time of starting the server using a GUI prepared in advance. Further, by opening the attachment file of the electronic mail to clear up the cause of the system down, it is possible to search the system log.

Figure 4B:
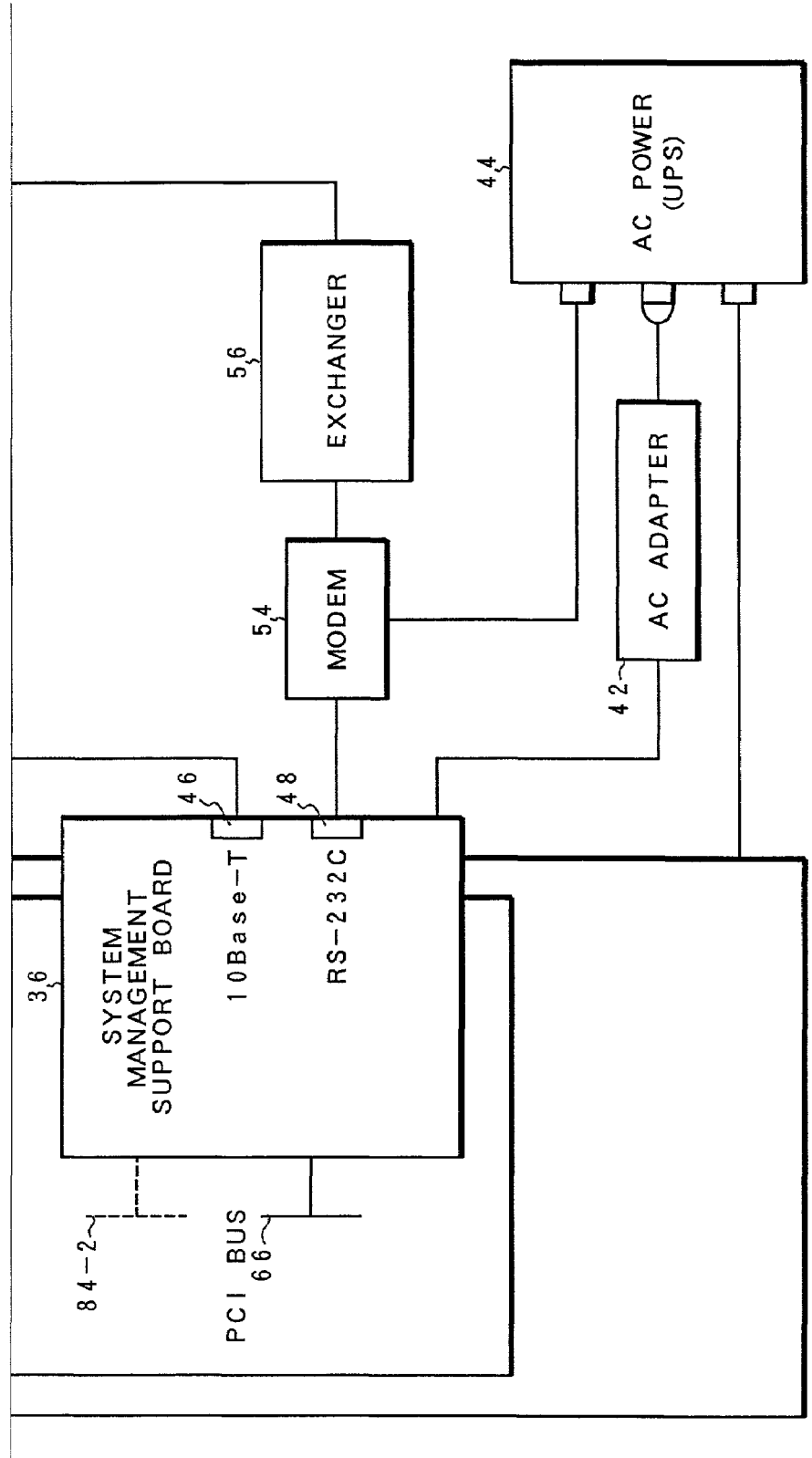

FIGS. 4A and 4B show the board constitution of the server machine 12 shown in FIGS. 2A and 2B. An OS 26, a setting tool driver 28 and the like provided by the baseboard 30 are installed into the server machine 12. The LAN module 32 for establishing communication with the remote maintenance server 16 by using an application is connected to the baseboard 30 by a PCI bus 66. Also, the IMP board 34 is connected to the baseboard 30 by the I2C bus 84-1. The server management support board 36 newly adopted according to the present invention is connected to the baseboard 30 by a PCI bus 66, the I2C bus 84-2. The server management support board 36 comprises two network interfaces using the LAN interface module 46 such as 10BASE-T and the WAN module 48 such as RS-232C. The LAN module 46 as well as the application side LAN module 32 is connected to the hub 50 and then to the LAN module 52 of remote maintenance server 16 by switching the hub 50. Further, the WAN module 48 is connected to the modem 58 of the remote maintenance server 16 through the modem 54 and the exchanger 56. Power is supplied to the server machine 12 from the AC power supply 44 serving as the UPS. In this supply of power, power is independently supplied to the server management support board 36 from the AC adapter 42. The server management support board 36 is, therefore, always in an operable state in which power is always supplied to the board 36.

Figure 5A:
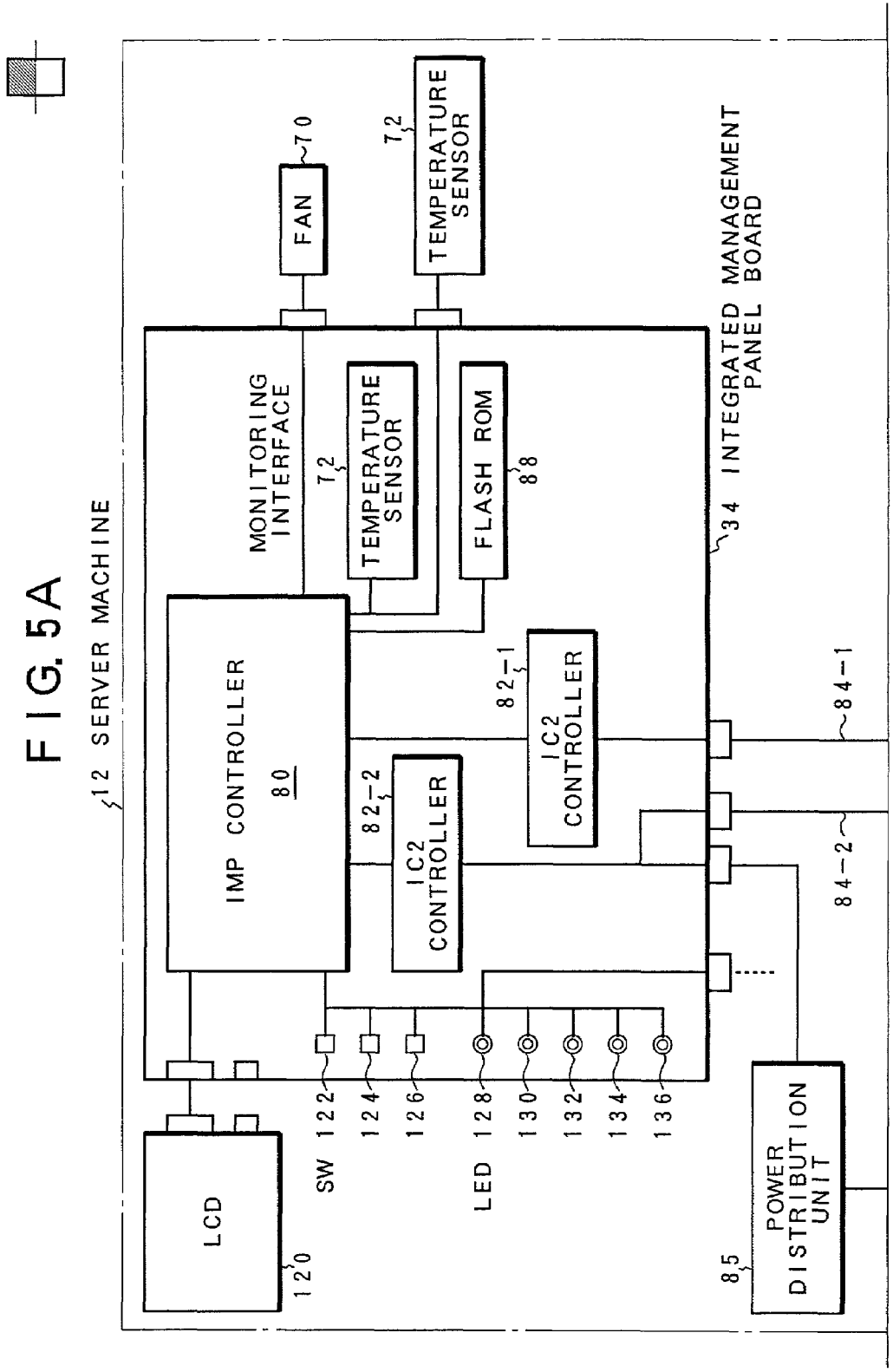

FIGS. 5A and 5B show the detail of the IMP board 34 as well as the detail of the server management support board 36 shown in FIGS. 4A and 4B. The IMP board 34 is provided with the IMP controller 80, I2C controllers 82-1 and 82-2 and a flash ROM 85. Further, the monitoring dedicated interface is connected from the IMP controller 80 to the temperature sensor 72 and the fan 70. The I2C bus 84-1 from the I2C controller 82-1 is connected to the baseboard 30. Further, the I2C bus 84-2 from the I2C controller 82-2 is connected to the power distribution unit 84 and the server management support board 36. Also, a liquid crystal display (LCD) 120 is connected to the IMP board 34. The LCD 120 can display characters of, for example, 2 lines×16 figures and displays a message indicating the state of the server machine 12 and the trouble thereof. Further, switches 122, 124 and 126 are provided on the IMP board 34. These switches are, for example, a power switch, a cursor switch and a set switch, respectively. Furthermore, LED's 128, 130, 132, 134 and 136 for display are provided on the IMP board 34 to conduct power-on display, check display, HDD access display, maintenance display, interference display and the like. The IMP controller 80 conducts power supply control, reset control and I2C controller control. To control the I2C controllers, the IMP controller 80 conducts a power supply operation, a reset operation and a trouble detection log acquisition operation. The log to be acquired is, for example, a BIOS log, an event log, a BIOS message or the like. If the server management support board 36 according to the present invention notifies a trouble, the BIO log is acquired as a system log and notified. The server management support board 36 comprises a CPU 138, an interface controller 90 and a nonvolatile memory 140 such as a flash memory or EEPROM. The interface controller 90 conducts PCI control connected by the LAN module 46 serving as the network interface, the WAN module 48 of the RS-232C and the PCI bus connector 142, and I2C control with the IMP board 34. The nonvolatile memory 140 acquires and stores a system log following a trouble which occurred since the system power is turned on until the application is started. The nonvolatile memory 140 also stores the diagnosis result of the POST diagnosis on the start processing, a replacement firmware sent from the remote management server 16 of the support center 14 shown in FIG. 1 and the like.

Figure 6A:
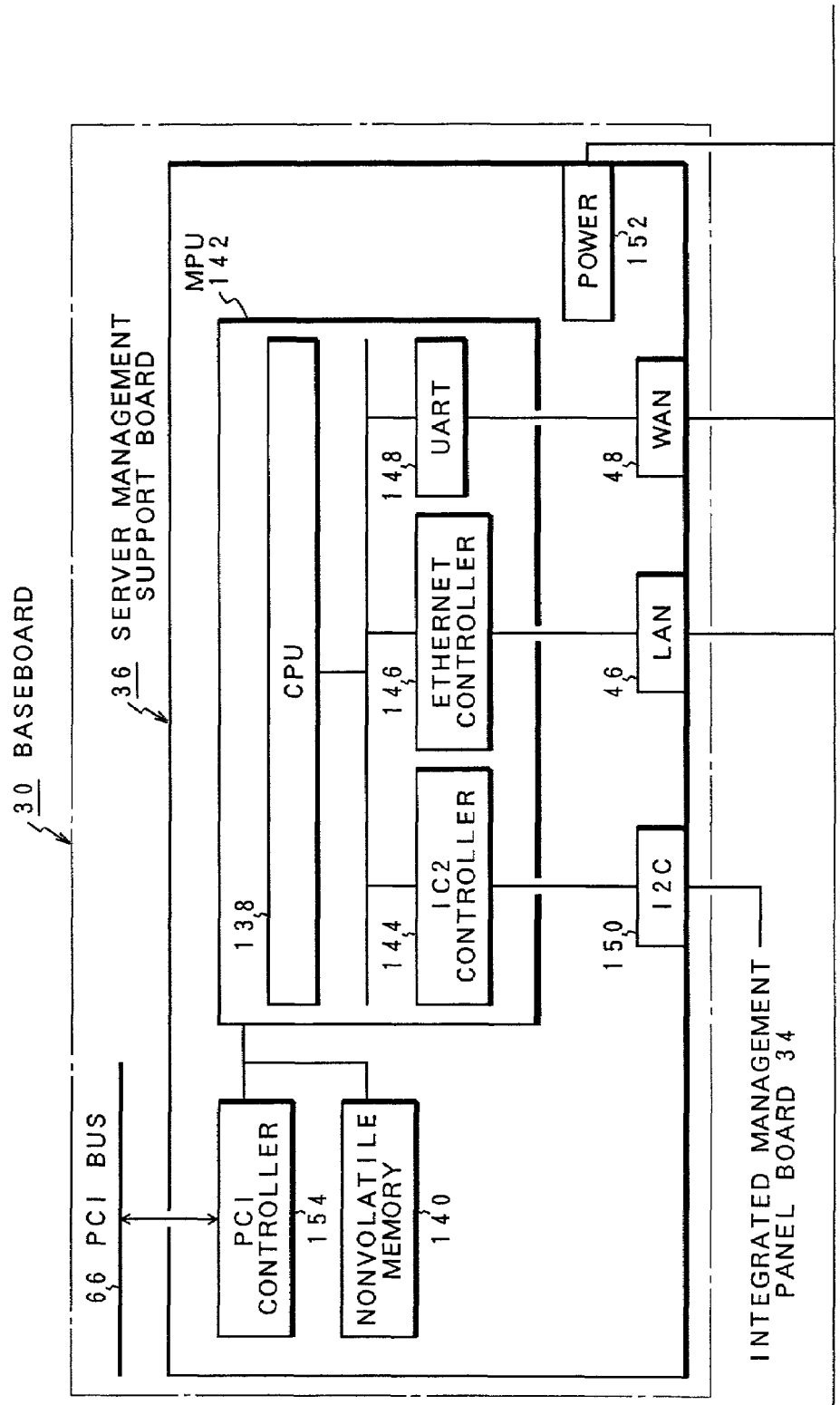

FIGS. 6A and 6B show the detail of the hardware constitution of the server management support board 36 shown in FIGS. 5A and 5B. The server management support board 36 is provided as a PCI board with respect to the PCI bus 66 on the baseboard 30. An MPU 142 is provided on the server management support board 36 provided as the PCI board. The MPU 142 is provided with a CPU 138, an I2C controller 144, an Ethernet controller 146 and a UART 148 serving as an asynchronous serial communication transmission circuit. The I2C controller 144 is connected to the IMP board 34 by the I2C bus through the I2C module. The Ethernet controller 146 is connected to the hub 50 through the LAN module 46 and then connected to the remote maintenance server 16 through the Internet 15. The UART 148 is connected to the remote maintenance server 16 through the WAN module 48 such as RS-232C and the external modem 54 by way of a telephone line by the exchanger 56. The power supply unit 152 on the server management support board 36 is constantly supplied with power which is a specified DC output converted from an ac input from the AC power supply 44. The MPU 142 is connected to the PCI bus 66 on the baseboard 30 side by the PCI controller 154. The nonvolatile memory 140 is further provided on the server management support board 36 to thereby provide a PCI communication buffer function of storing a system log acquired during the detection of the trouble which occurred at the time of starting the system and a trouble flag when abnormality occurs to electronic mail communication using the LAN module 46 on the server management support board 36. Here, the system log attached to an electronic mail for notifying the trouble which occurred during the system start processing can be acquired by one of the following methods. Whenever the log is stored in the nonvolatile memory 78 provided on the baseboard 30 shown in FIG. 3, the log is sent to the server management support board 36 by way of the IMP board 34 and stored in the nonvolatile memory 140; or if a trouble during the start processing is detected, all system logs stored in the nonvolatile memory 78 are collectively read and transferred to the nonvolatile memory 140 of the server management support board 36 by way of the IMP board 34.

FIGS. 7A and 7B are flowcharts showing a series of integrated management board processings conducted by the trouble monitoring unit 110 provided on the IMP board 34 shown in FIGS. 3A and 3B. In an operation S1, the administrator checks whether or not the power of the system is turned on. If the power is turned on, an operation S2 follows in which the first timer for monitoring the operation of the POST diagnosis unit 101 on the baseboard 30 is started. If the power is turned on, the start processing unit 100 of the baseboard 30 operates and the operation of the POST diagnosis unit 101 normally starts, then a status command indicating the start of POST diagnosis is received from the baseboard 30 in an operation S3. If the status command indicating the start of the POST diagnosis is not received, the time-out of the first timer is checked in an operation S3. If the status command indicating the start of POST diagnosis is not received after predetermined time passes since the start of the first timer, then the time-out of the first timer is determined and it is judged that a trouble caused by system down occurred since the power is turned on until the POST diagnosis is started in an operation S4. Trouble notification processing is conducted to the server management board 36 in an operation S6. If the status command indicating the start of POST diagnosis is normally obtained in the operation S3, the second timer for monitoring time since the POST diagnosis is started until the next BOOT in an operation S5. In an operation S7, it is checked whether a status command is received by starting the BOOT processing unit 102. If the status command is not received, the time-out of the second timer is checked in an operation S8. Here, if a trouble occurred since the start of POST diagnosis until the BOOT processing and the system is down, then the time-out of the second timer is determined in an operation S8 and an operation S10 follows. In the operation S10, trouble notification processing is conducted to the server management support board 36. If the BOOT processing unit 102 is normally started and the status command is obtained in the operation S7, the third timer is started in an operation S9. The third timer monitors time from the BOOT until the start of the application. In an operation S11, a status command following the start of the application is checked. If the status command is not received, the time-out of the third timer is checked in an operation S12. If a trouble occurred since the BOOT until the start of the application and the system is down, then the time-out of the third timer is determined in an operation S12. In this case, the trouble notification processing is conducted to the server management support board 36 in an operation S13. If the BOOT processing is conducted and the status command indicating that the application is normally started is received in the operation S11, then the application 108 and the monitoring agent 114 turn into an operable state on the baseboard 30 as shown in FIGS. 3A and 3B, and the application 108 executes a job requested by the server machine 12. If a hardware error such as one-bit error or two-bit error is detected by the trouble monitoring unit 110 during the operation of the system in which this application 108 operates, then it is determined that there is an error in an operation S14 and the application 108 is notified of the occurrence of the error in an operation S15. At the same time, the trouble monitoring unit 110 displays the error on the liquid crystal display, the LED or the like on the IMP board 34. Further, if there is provided a function of notifying the remote maintenance server 16 of an error as the application 108 on the server board 12-1 side, an alarm message indicating the occurrence of the error can be included in, for example, an electronic mail by this application and the remote maintenance server 16 can be notified of the trouble which occurred during the operation of the server using the LAN module 32 side network interface. The processings of the operations S14 and S15 are repeated until an end instruction is issued by the switch operation of the administrator. If the end instruction is issued in the operation S16, necessary end processing including data evacuation is conducted in an operation s17 and the power of the system is turned off in an operation S18.

Figure 8:
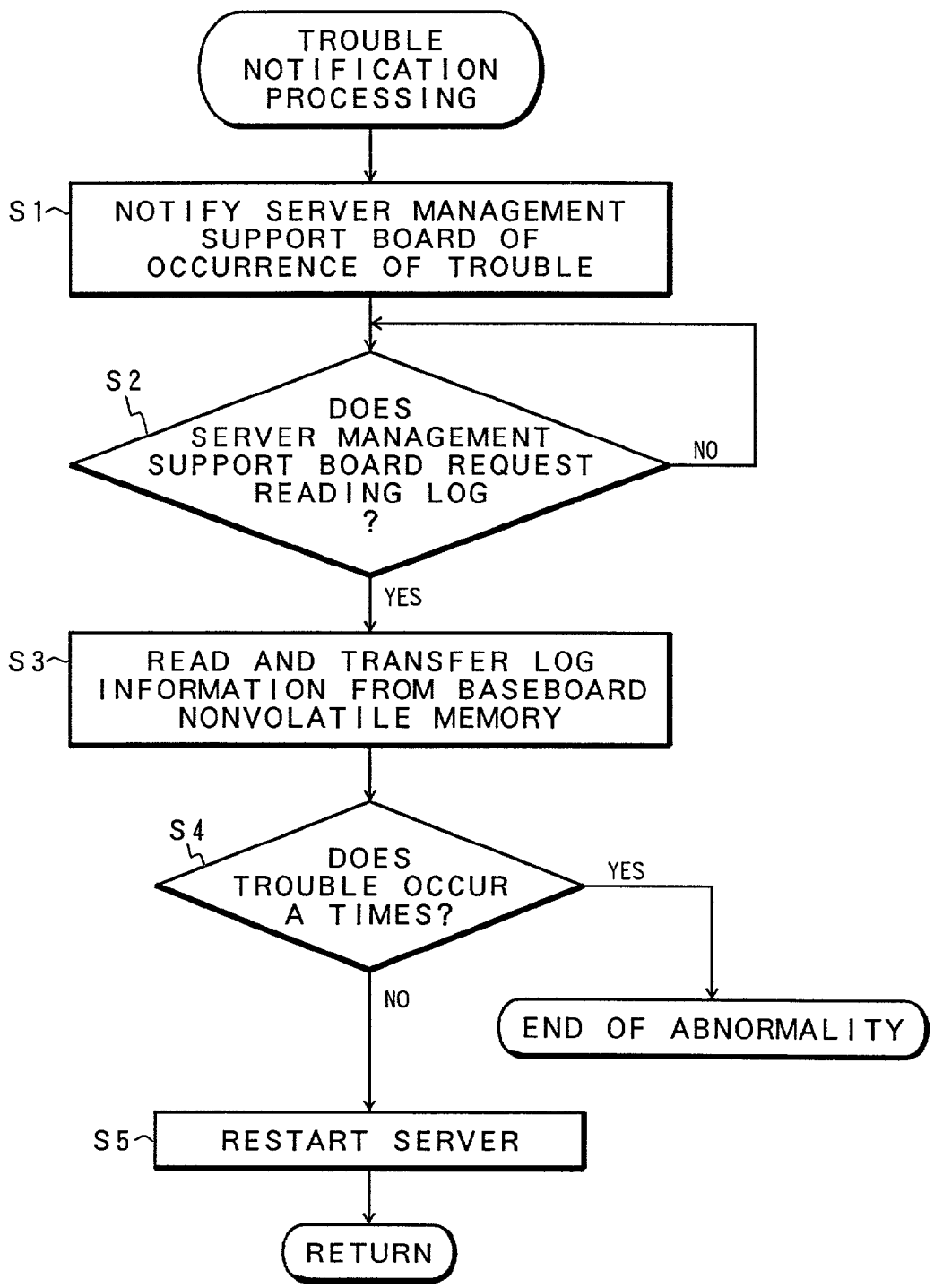
FIG. 8 is a flowchart showing a series of trouble notification processings in FIG. 7.

FIG. 8 is a flowchart showing a series of trouble notification processings in the operations S6, S10 and S13 shown in FIGS. 7A and 7B. If a trouble occurs and the system is down in the course of the start processing such as the POST diagnosis, the BOOT processing or the start of the application on the baseboard 30, then the trouble notification unit 112 on the server management support board 36 is notified of the occurrence of the trouble in an operation S1. In an operation S2, it is checked whether or not the server management support board 36 makes a log read request in response to this trouble occurrence notification. If the log read is requested, a system log is read from the log storage unit 106 of the nonvolatile memory 78 on the baseboard 30 as log information and transferred to the server management support board 36 in an operation S3. Then, in an operation S4, it is checked whether or not the number of times of the occurrence of the system down during the start processing reaches a preset number A. If the number does not reach A, a server start processing is conducted in an operation S5. This server start processing may be a power-on processing after the power is turned off or a reset processing. If the number of times of trouble occurrence reaches A in the operation S4, the server is not restarted but ended because of abnormality. Here, a series of trouble notification processings shown in FIG. 8 are described, while taking, as an example, a case of collectively reading system logs acquired so far at the time of the occurrence of a trouble by the log storage unit 106 on the baseboard 30 and transferring the system logs to the server management support board 36. If the log is transferred from the baseboard 30 to the server management support board 36 every time the log occurs, the log read request and the log transfer in the operations S2 and S3 become unnecessary.

Figure 9:
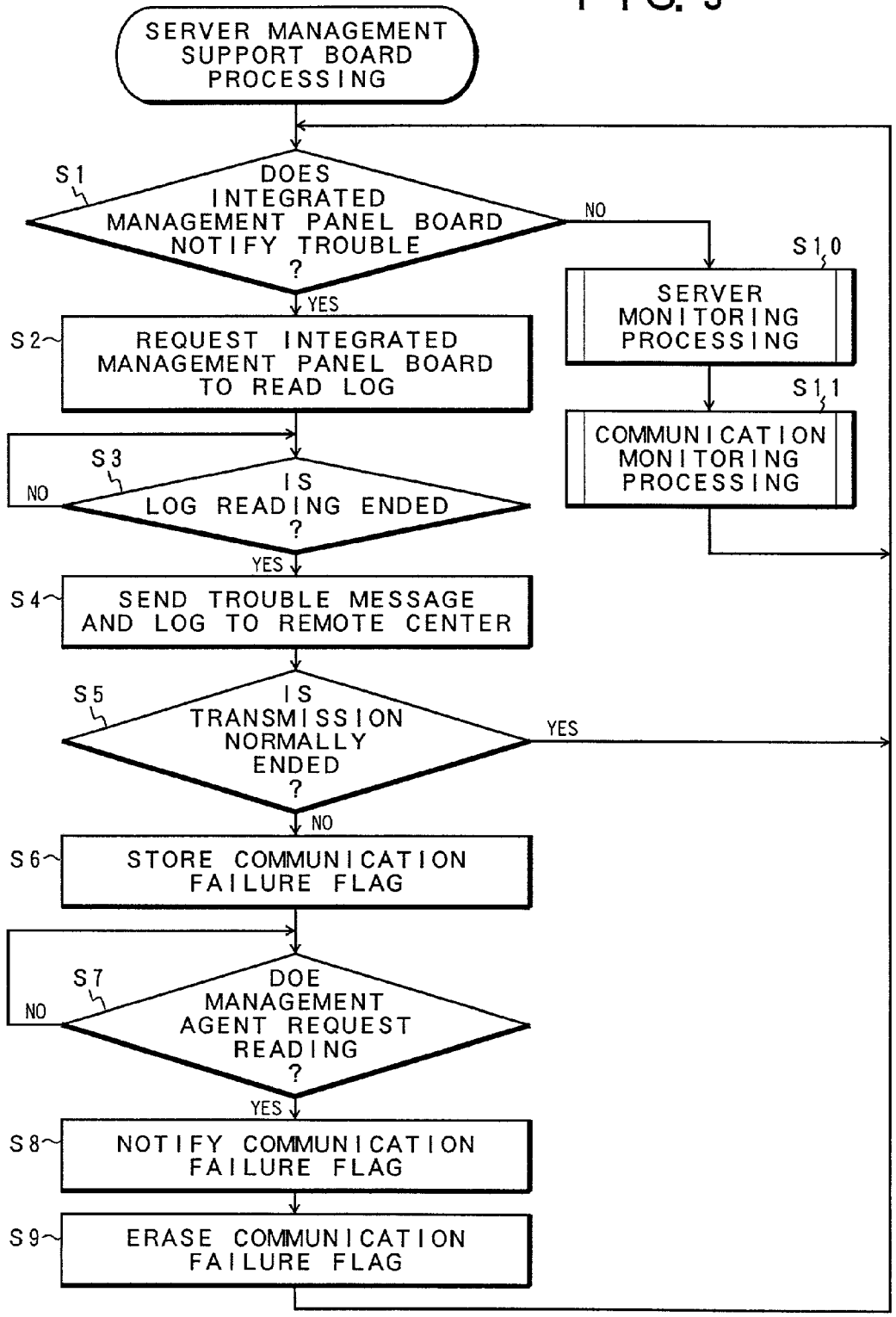
FIG. 9 is a flowchart showing a series of server management support board processings conducted by a trouble notification unit shown in FIGS. 2A and 2B.

FIG. 9 is a flowchart showing a series of server management support board processings conducted by the trouble notification unit 112 provided on the server management support board 36 shown in FIGS. 3A and 3B. In the server management support board processings, it is first checked whether or not a trouble in the start processing is notified from the IMP board 34 in an operation S1. If a trouble occurs during the start processing, the system is down and a trouble notification follows, then the trouble notification unit 110 on the IMP board 34 is requested to read a log from the baseboard 30 in an operation S2. If a system log is transferred in response to this log read request and it is determined in an operation S3 that log read is completed, then an electronic mail including an alarm message indicating the system down during the start processing is created, the system log thus obtained is added to this electronic mail and the electronic mail and the system log are transferred to the remote maintenance server 16 of the support center. If this alarm message and the system log are notified by means of the electronic mail and the transmission of the alarm message and the system log to the mail server is normally ended in an operation S5, then the processing returns to the operation S1 and a series of trouble notification processings are ended. On the other hand, if the system operates in a state in which the start processing is normally conducted and the application is normally started, server monitoring processing is conducted in an operation S10 and communication management processing is conducted in an operation S11. The details of these processings will be made clear in FIG. 11. If the transmission of the trouble message and the system log to the support center, i.e., the transmission of the electronic mail to the mail server is ended because of abnormality in an operation S4, operations S5 and S6 follow and a communication failure flag indicating the failure of the transmission of the electronic mail is stored in the PCI communication buffer secured in the nonvolatile memory 140 shown in FIGS. 6A and 6B. At the time of storing this communication trouble flag, the server machine 12 side conducts a start processing by turning on the power again to deal with the system down. If the application 108 and the monitoring agent 114 are normally started by the restart, then the monitoring agent 114 makes a state flag read request to the trouble notification unit 112 on the server management support board 36 and the state flag is discriminated in an operation S8. Then, in an operation S9, the communication failure flag stored in the operation S6 is notified to the monitoring agent 114. By doing so, the monitoring agent 114 can recognize that the alarm message indicating the system down during the previous start processing and the system log thereof are not transmitted to the support center because of the communication trouble of server management support board 36 and conduct a necessary processing to deal with this situation at need. If the transmission failure flag is notified in the operation S9, the transmission failure flag is erased.

Figure 10:
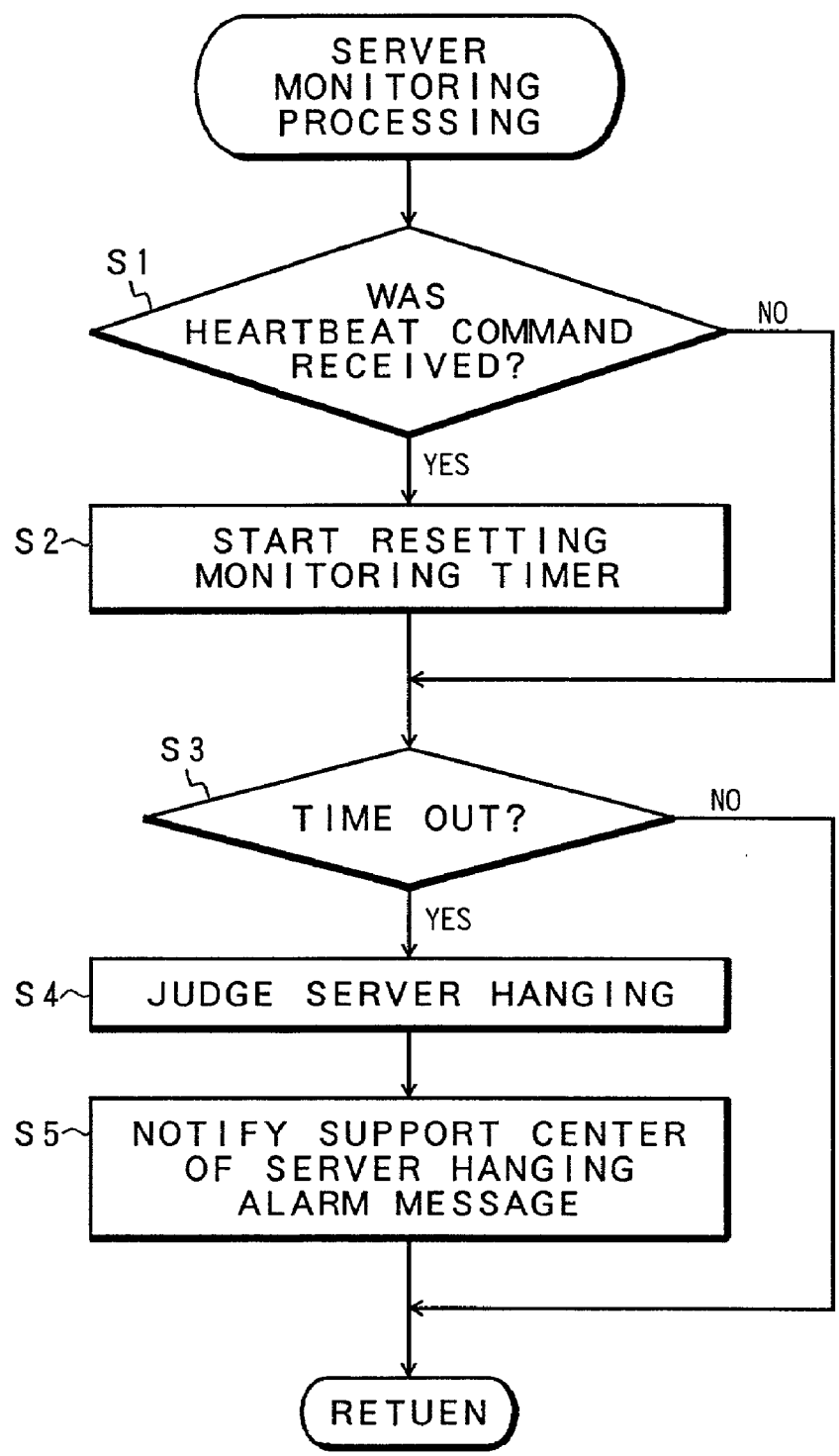
FIG. 10 is a flowchart showing a series of server monitoring processings shown in FIG. 9.

FIG. 10 is a flowchart showing a series of server monitoring processings in the operation S6 shown in FIG. 6B. If the server board 12-1 side shown in FIGS. 3A and 3B conducts a normal start processing and the application 108 and the monitoring agent 114 are thereby started, the monitoring agent 114 regularly sends a heartbeat command to the trouble notification unit 112 on the server management support board 36 by the PCI bus. In the server monitoring processings shown in FIG. 10, it is checked whether or not the heartbeat command from the monitoring agent 114 is received in an operation S1. If the heartbeat command is received, a monitoring timer functioning as a watchdog timer is reset and started in an operation S2. In an operation S3, the time-out of the monitoring timer until the heartbeat command is discriminated is checked in the operation S1. If the server machine 12 normally operates, the next heartbeat command is received before the time-out of the monitoring timer and a watchdog processing for resetting and starting the monitoring timer is repeated in the operation S2. If the server machine 12 hangs during the operation of the system, the heartbeat command from the monitoring agent 14 is not received and the time-out of the monitoring timer is determined in the operation S3. Following the time-out of the monitoring timer, it is judged that the server hangs in an operation S4, and a system log is attached to an alarm message indicating that the system hangs and the alarm message and the system log are notified to the remote maintenance server 16 by means of an electronic mail using the server board 12-1 side LAN module 32 serving as the network interface.

Figure 11:
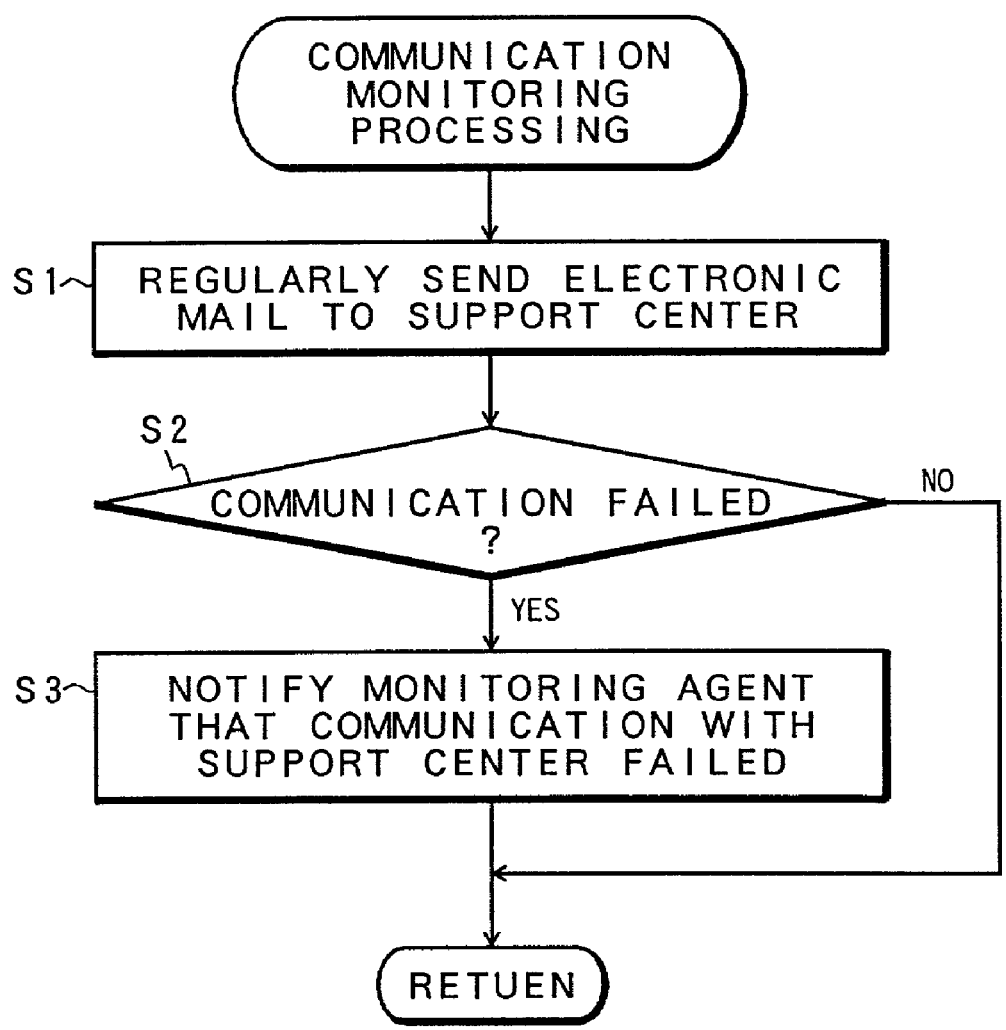
FIG. 11 is a flowchart showing a series of communication monitoring processings shown in FIG. 9.

FIG. 11 is a flowchart showing a series of communication monitoring processings for monitoring the communication with the remote maintenance server 16 conducted by the trouble notification unit 112 provided on the server management support board 36 in the operation S12 shown in FIG. 9. In the communication monitoring processings, the trouble notification unit 112 transmits an electronic mail including a status message to the mail server on the Internet 15 using the LAN module 46 serving as the network interface in an operation S1. If the electronic mail is regularly transmitted to the mail server, 'connect time-out' which means the mail server does not respond to the transmission or the abnormality of the communication protocol is detected and the communication thereby fails, then the monitoring agent 114 is notified that the communication fails in an operation S3. Then, the monitoring agent 114 side notifies the remote maintenance server 16 that a trouble occurs to the communication function of the server management support board 36 through the LAN module 32 serving as the network interface.

Figure 12:
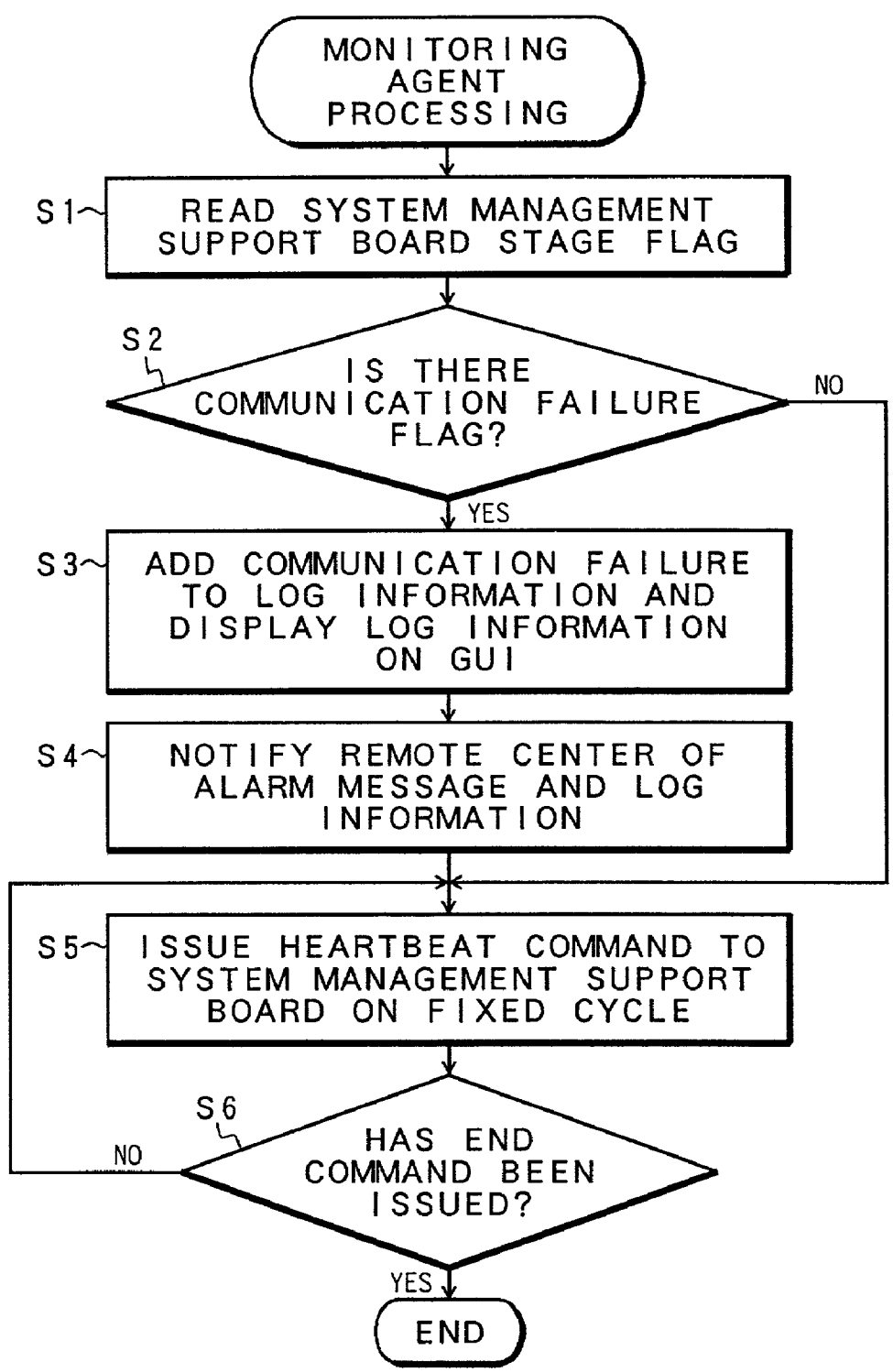
FIG. 12 is a flowchart showing a series of processings conducted by a monitoring agent shown in FIGS. 2A and 2B.

FIG. 12 is a flowchart showing a series of monitoring agent processings conducted by the monitoring agent 114 existing on the baseboard 30 side shown in FIGS. 3A and 3B. First, in an operation S1, the state flag of the server management support board 36 is read. If it is determined that the state flag thus read is a communication failure flag in an operation S2, the failure of the communication of the alarm message indicating the system down during the start processing and the system log thereof to the remote maintenance server 16 is added to log information and displayed on the screen using, for example, the GUI to the administrator in an operation S3. Further, in an operation S4, the alarm message indicating the system down and the system log thereof which cannot be notified to the remote maintenance server 16 are acquired and notified to the remote maintenance server 16 by way of the mail server using an electronic mail and an attachment file thereof through the baseboard 30 side LAN module 32 serving as the network interface in an operation S4. By doing so, the support center side can recognize the trouble which causes the system down during the start processing and conduct a necessary processing to deal with the trouble. If the notification to the support center is ended in the operation S4 or the state flag is not a transmission failure flag in the operation S2, a heartbeat command is regularly issued to the server management support board 36 in an operation S5 to thereby allow the trouble notification unit 112 provided on the server management support board 36 shown in FIG. 10 to conduct server management processing. The processings of the operations S1 to S5 are repeated until an end instruction because of the stop of the server is issued in an operation S6.

As stated so far, according to the present invention, if a trouble occurs during the system start processing before the application for the computer system such as a server is started, then not only the occurrence of the trouble to the system but also a system log acquired at that moment are automatically notified to the external remote management server through the network interface. Even if the system is down due to the trouble during the start processing before starting the application, the trouble is recognized by the external support center. At the same time, the cause of the abnormality is cleared up by referring to the system log, thereby making it possible to strongly support the computer system by remote monitoring.

Furthermore, by providing the function of notifying a system abnormality which occurs during the system start processing until the start of the application and the system log thereof to the external system, to the standard board as the server management support board, it is possible to simply, easily establish a strong support structure linked to the external maintenance management system.

Further, the monitoring agent serving as the application monitors the processing function of the server management support board newly adopted according to the present invention. By doing so, a communication trouble or the like on the server management support board side is monitored by the system side application. Even if the trouble during the start processing cannot be notified to the external system because of, for example, the communication trouble of the server management support board, the communication trouble can be recognized by the application when starting the system next time, and notified to the external support center, thereby making it possible to appropriately deal with the trouble.

Moreover, by regularly establishing communication between the server management support board and the external remote maintenance system, it is possible to detect the abnormality of the communication system in advance and to take appropriate, necessary measures.

The above embodiment has been described, while taking the server machine as an example; however, the present invention should not be limited to the server machine. The present invention can be applied to a system wherein an appropriate computer system is maintained through a network by a remote maintenance server. Further, the present invention should not be limited to the above embodiment and may include appropriate modifications which do not depart from the object and do not miss the advantages of the invention. Moreover, the present invention should not be limited to the numeric values indicated in the above embodiment.

What is claimed is:

1. A apparatus comprising:
a start processing unit which conducts a start processing, and then starts an application when a system power supply is turned on;
a trouble monitoring unit which controls the system power supply, and integrally monitors a trouble of said start processing unit and a trouble during system operation;
a trouble notification unit which acquires log information stored in said start processing unit, and notifies an external remote maintenance system of the log information through a first network interface, which is independent of a second network interface made available by said application, if said trouble monitoring unit detects the trouble of said start processing unit; and
a power supply, independent of said system power supply, for powering said trouble notification unit.

2. A apparatus according to claim 1, wherein said start processing unit is provided on a baseboard, said trouble monitoring unit is provided on an integrated management panel board, and said trouble notification unit is provided on a system management support board, the system management support board comprising a dedicated power unit constantly supplied with power, a board interface connected to said integrated management panel board, and the first network interface connecting said remote maintenance system.

3. A apparatus according to claim 2, wherein said system management support board is an interface board connected to an interface provided on the baseboard of the apparatus system.

4. An apparatus, comprising:
a start processing unit which conduct a start processing, and then start an application when power of a apparatus system is turned on;
a trouble monitoring unit which control the power of the apparatus system, and integrally monitor a trouble of said start processing unit and a trouble during system operation; and
a trouble notification unit which acquire log information stored in said start processing unit, and notify an external remote maintenance system of the log information through a network interface if said trouble monitoring unit detects a trouble of said start processing unit,
wherein said start processing unit is provided on a baseboard, said trouble monitoring unit is provided on an integrated management panel board, and said trouble notification unit is provided on a system management support board, the system management support board comprising a dedicated power unit constantly supplied with power, a board interface connected to said integrated management panel board, and the network interface connecting said remote maintenance system, wherein said system management support board is an interface board connected to an interface provided on the baseboard of the apparatus system, and wherein said system management support board is a PCI board connected to a PCI bus provided on the baseboard of the apparatus system.

5. An apparatus, comprising:

a start processing unit which conduct a start processing, and then start an application when power of a apparatus system is turned on;

a trouble monitoring unit which control the power of the apparatus system, and integrally monitor a trouble of said start processing unit and a trouble during system operation; and a trouble notification unit which acquire log information stored in said start processing unit, and notify an external remote maintenance system of the log information through a network interface if said trouble monitoring unit detects the a trouble of said start processing unit, and wherein a monitoring agent which monitor the trouble of the trouble notification unit provided on said system management support board is provided on the apparatus system side as an application, and an interface coupled to said monitoring agent is provided on said system management support board.

6. A apparatus according to claim 5, wherein the interface coupled to said monitoring agent is a PCI bus.

7. A apparatus according to claim 5, wherein said trouble notification unit on the system management support board stores a communication failure flag in a memory when notification of an alarm message and the log information to the remote maintenance system fails; and if the apparatus system is restarted, said monitoring agent on the apparatus system side notifies said remote maintenance system of the alarm message indicating that a communication trouble occurred to said trouble notification unit through the network interface on the baseboard based on said communication failure flag.

8. A apparatus according to claim 5, wherein said trouble notification unit on the system management support board regularly communicates with said remote maintenance system using a network interface of the trouble notification unit, and stores a communication failure flag in a memory when detecting abnormality of communication; and said monitoring agent on the server system side notifies said remote maintenance system of an alarm message indicating a communication trouble on said trouble notification unit side through the network interface on the baseboard based on said communication failure flag.

9. A apparatus according to claim 5, wherein said monitoring agent on the communication system side regularly issues a regular notification command indicating that the apparatus system side normally operates; and said trouble notification unit on the system management support board detects that the apparatus system is abnormal if said regular notification command is stopped, and notifies the remote maintenance system of an alarm message.

10. A system management support apparatus, comprising:
a support board, comprising:

a board interface which connects to an integrated management panel board for controlling a system power supply, and monitoring a trouble of the system;

a first network interface connecting an external remote maintenance system; and a trouble notification unit which acquires log information when receiving trouble information generated since the power of the system is turned on until a start processing is conducted and an application is started, from said integrated management panel board, and notifies the external remote maintenance system of the log information, wherein said board interface, said first network interface, and said trouble notification unit are provided on the support board connectable to an interface of the system and wherein the first network interface is independent of a second network interface made available by the application, and a second power supply, which constantly supplies power independently of said system power supply, for powering said support board.

11. An apparatus according to claim 10, wherein said power supply unit, said board interface, said first network interface, and said trouble notification unit are provided on an interface board connected to an interface provided on a baseboard of the apparatus system.

12. A system management support apparatus, comprising:
a support board, comprising:

a power supply unit which constantly supplies power;

a board interface which connects to an integrated management panel board for controlling a system power supply, and monitoring a trouble of the apparatus system;

a network interface connecting an external remote maintenance system; and a trouble notification unit which acquire log information when receiving trouble information generated since the power of the system is turned on until a start processing is conducted and an application is started, from said integrated management panel board, and notify the external remote maintenance system of the log information, and wherein said power supply unit, said board interface, said network interface and said trouble notification unit are provided on the support board connectable to an interface of the apparatus system and wherein said power supply unit, said board interface, said network interface and said trouble notification unit are provided on a PCI board connected to a PCI bus provided on a baseboard of the apparatus system.

13. A system management support apparatus, comprising:
a support board, comprising:

a power supply unit which constantly supplies power;

a board interface which connects to an integrated management panel board for controlling a system power supply, and monitoring a trouble of the apparatus system;

a network interface connecting an external remote maintenance system; and a trouble notification unit which acquire log information when receiving trouble information generated since the power of the system is turned on until a start processing is conducted and an application is started, from said integrated management panel board, and notify the external remote maintenance system of the log information, and wherein said power supply unit, said board interface, said network interface and said trouble notification unit are provided on the support board connectable to an interface of the apparatus system and wherein an interface coupled to a monitoring agent provided on the apparatus system side as an application is provided.

14. An apparatus according to claim 13, wherein the interface coupled to said monitoring agent is a PCI bus.

15. An apparatus according to claim 14, wherein
said trouble notification unit stores a communication failure flag in a memory when notification of an alarm message and the log information to the remote maintenance system fails; and
if the apparatus system is restarted, said monitoring agent on the apparatus system side notifies said remote maintenance system of the alarm message indicating that a communication trouble occurred to said trouble notification unit through the network interface on the baseboard based on the communication failure flag.

16. An apparatus according to claim 14, wherein
said trouble notification unit regularly communicates with said remote maintenance system using a network interface of the trouble notification unit, and stores a communication failure flag in a memory when detecting abnormality of communication; and
said monitoring agent on the apparatus side notifies said remote maintenance system of an alarm message indicating abnormality of communication on said trouble notification unit side through the network interface on the baseboard based on said communication failure flag.

17. An apparatus according to claim 14, wherein said trouble notification unit detects that the apparatus system is abnormal if a regular notification command regularly issued from the monitoring agent on the apparatus system side is stopped, and notifies the remote maintenance system of an alarm message.

18. A apparatus system management method, comprising:
a start processing operation of conducting a start processing, and then starting an application when power of a computer system is turned on
a trouble monitoring operation of controlling the power of the computer system, and integrally monitoring a trouble of said start processing unit; and
a trouble notification operation of acquiring log information, and notifying an external remote maintenance system of the log information through a first network interface, which is independent of a second network interface made available by the application, irrespective of the presence of power supply from said power supply controlled by said trouble monitoring step if a trouble of said start processing unit is detected in said trouble monitoring operation occurring during a period from a turn-on of a system power supply, through activation, to a start-up of the application.

19. A apparatus system management method, comprising:
a start processing operation of conducting a start processing, and then starting an application when power of a computer system is turned on;
a trouble monitoring operation of controlling the power of the computer system, and integrally monitoring a trouble of said start processing unit; and
a trouble notification operation of acquiring log information, and notifying an external remote maintenance system of the log information through a network interface if the a trouble of said start processing unit is detected in said trouble monitoring operation, and
wherein a monitoring agent provided on the apparatus system side as an application monitors the trouble in said trouble notification operation.

20. A method according to claim 19, wherein
in said trouble notification operation, a communication failure flag is stored in a memory when notification of an alarm message and the log information to the remote maintenance system fails; and
if the apparatus system is restarted, said monitoring agent notifies said remote maintenance system of the alarm message indicating that a trouble occurred to said trouble notification operation through the network interface on the computer system side based on said communication failure flag.

21. A method according to claim 19, wherein
in said trouble notification operation, communication with said remote maintenance system is regularly established using a network interface, and a communication failure flag is stored in a memory when abnormality of the communication is detected; and
said monitoring agent notifies said remote maintenance system of an alarm message indicating abnormality of the communication in said trouble notification operation through the network interface on the apparatus system side based on said communication failure flag.

22. A method according to claim 19, wherein
said monitoring agent regularly issues a regular notification command indicating that the apparatus system normally operates; and
in said trouble notification operation, abnormality of the apparatus system is detected if said regular notification command is stopped, and an alarm message is notified to the remote maintenance system.

23. A system coupled to a network, the system comprising:
a server performing start-up processing comprising power on processing, diagnostic processing, boot-up processing and application start processing and storing a log of events during the start-up processing in a memory and stopping when start-up processing fails; and
a monitoring system monitoring the start-up processing, accessing the memory and sending a message, including the log, over the network, using a first network interface that is independent of a second network interface made available by the application, indicating start-up processing failure while the server is stopped due to start-up processing failure.

* * * * *

UNITED STATES PATENT AND TRADEMARK OFFICE
CERTIFICATE OF CORRECTION

PATENT NO. : 7,080,285 B2
APPLICATION NO. : 09/765632
DATED : July 18, 2006
INVENTOR(S) : Mikayo Kosugi et al.

It is certified that error appears in the above-identified patent and that said Letters Patent is hereby corrected as shown below:

On the Title Page, Item (57) Abstract, line 11, change "trough" to --through--

Col. 17, line 24, after "the" delete "a"

Col. 19, line 48, after "on" insert --;--

Col. 20, line 11, after "the" delete "a"

Signed and Sealed this

Fifteenth Day of May, 2007

JON W. DUDAS
*Director of the United States Patent and Trademark Office*